(12) United States Patent
Berroa et al.

(10) Patent No.: US 12,416,908 B2
(45) Date of Patent: Sep. 16, 2025

(54) SYSTEMS AND METHODS FOR MANUFACTURING LIGHT FIXTURES

(71) Applicant: Integrated Illumination Systems, Inc., Morris, CT (US)

(72) Inventors: Julio Angel Ramirez Berroa, Fishkill, NY (US); Muthuraman Palaniappan, Torrington, CT (US); Mark Alphonse Zampini, Watertown, CT (US)

(73) Assignee: Integrated Illumination Systems, Inc.

( * ) Notice: Subject to any disclaimer, the term of this patent is extended or adjusted under 35 U.S.C. 154(b) by 449 days.

(21) Appl. No.: 18/090,943

(22) Filed: Dec. 29, 2022

(65) Prior Publication Data

US 2024/0219888 A1    Jul. 4, 2024

(51) Int. Cl.
G05B 19/4097    (2006.01)

(52) U.S. Cl.
CPC ............. *G05B 19/4097* (2013.01); *G05B 2219/35081* (2013.01)

(58) Field of Classification Search
None
See application file for complete search history.

(56) References Cited

U.S. PATENT DOCUMENTS

| | | |
|---|---|---|
| 4,139,770 A | 2/1979 | Beyersdorf |
| 5,264,997 A | 11/1993 | Hutchisson et al. |
| 5,465,199 A | 11/1995 | Bray et al. |
| 5,561,346 A | 10/1996 | Byrne |
| 5,783,909 A | 7/1998 | Hochstein |
| 5,909,429 A | 6/1999 | Satyanarayana et al. |
| 5,947,587 A | 9/1999 | Keuper et al. |
| 6,013,988 A | 1/2000 | Bucks et al. |
| 6,016,038 A | 1/2000 | Mueller et al. |
| 6,040,663 A | 3/2000 | Bucks et al. |
| 6,094,014 A | 7/2000 | Bucks et al. |
| 6,127,783 A | 10/2000 | Pashley et al. |

(Continued)

FOREIGN PATENT DOCUMENTS

WO    WO-03/017733 A1    2/2003

OTHER PUBLICATIONS

Application Note AN-944, "Use Gate Charge to Design the Gate Drive Circuit for Power MOSFETs and IGBTs," International Rectifier, 2001, 5 pages.

(Continued)

*Primary Examiner* — Jason Lin
(74) *Attorney, Agent, or Firm* — Foley & Lardner LLP

(57) ABSTRACT

Systems and methods for manufacturing light fixtures. A data processing system can identify a plurality of attributes of a lighting system. The plurality of attributes can comprise at least one of a luminescent type, a mounting type, or a luminescent feature. The data processing system can detect, responsive to input via a graphical user interface, a layout for installation of the lighting system. The data processing system can select, using a model configured to satisfy a gap constraint, a plurality of light fixtures based on the layout and the plurality of attributes that, when electrically coupled to conform to the layout, satisfy the gap constraint. The data processing system can provide an instruction to cause manufacturing of the selected plurality of light fixtures in accordance with the layout and the plurality of attributes.

20 Claims, 11 Drawing Sheets

(56) References Cited

U.S. PATENT DOCUMENTS

| | | |
|---|---|---|
| 6,147,458 A | 11/2000 | Bucks et al. |
| 6,150,774 A | 11/2000 | Mueller et al. |
| 6,157,093 A | 12/2000 | Giannopoulos et al. |
| 6,166,496 A | 12/2000 | Lys et al. |
| 6,194,839 B1 | 2/2001 | Chang |
| 6,201,353 B1 | 3/2001 | Chang et al. |
| 6,211,626 B1 | 4/2001 | Lys et al. |
| 6,234,645 B1 | 5/2001 | Borner et al. |
| 6,234,648 B1 | 5/2001 | Borner et al. |
| 6,236,331 B1 | 5/2001 | Dussureault |
| 6,238,065 B1 | 5/2001 | Jones |
| 6,249,088 B1 | 6/2001 | Chang |
| 6,250,774 B1 | 6/2001 | Begemann et al. |
| 6,253,530 B1 | 7/2001 | Price et al. |
| 6,288,497 B1 | 9/2001 | Chang et al. |
| 6,292,901 B1 | 9/2001 | Lys et al. |
| 6,299,329 B1 | 10/2001 | Mui et al. |
| 6,304,464 B1 | 10/2001 | Jacobs et al. |
| 6,305,818 B1 | 10/2001 | Lebens et al. |
| 6,340,864 B1 | 1/2002 | Wacyk |
| 6,340,868 B1 | 1/2002 | Lys et al. |
| 6,384,545 B1 | 5/2002 | Lau |
| 6,411,046 B1 | 6/2002 | Muthu |
| 6,441,558 B1 | 8/2002 | Muthu et al. |
| 6,443,592 B1 | 9/2002 | Unger et al. |
| 6,445,139 B1 | 9/2002 | Marshall et al. |
| 6,459,919 B1 | 10/2002 | Lys et al. |
| 6,489,731 B1 | 12/2002 | Bruning et al. |
| 6,495,964 B1 | 12/2002 | Muthu et al. |
| 6,507,158 B1 | 1/2003 | Wang |
| 6,507,159 B2 | 1/2003 | Muthu |
| 6,510,995 B2 | 1/2003 | Muthu et al. |
| 6,513,949 B1 | 2/2003 | Marshall et al. |
| 6,528,954 B1 | 3/2003 | Lys et al. |
| 6,552,495 B1 | 4/2003 | Chang |
| 6,576,881 B2 | 6/2003 | Muthu et al. |
| 6,577,080 B2 | 6/2003 | Lys et al. |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,609,813 B1 | 8/2003 | Showers et al. |
| 6,617,795 B2 | 9/2003 | Bruning |
| 6,621,235 B2 | 9/2003 | Chang |
| 6,630,801 B2 | 10/2003 | Schuurmans |
| 6,636,003 B2 | 10/2003 | Rahm et al. |
| 6,639,368 B2 | 10/2003 | Sheoghong |
| 6,676,284 B1 | 1/2004 | Wynne Willson |
| 6,692,136 B2 | 2/2004 | Marshall et al. |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,762,562 B2 | 7/2004 | Leong |
| 6,777,891 B2 | 8/2004 | Lys et al. |
| 6,788,011 B2 | 9/2004 | Mueller et al. |
| 6,796,680 B1 | 9/2004 | Showers et al. |
| 6,796,686 B2 | 9/2004 | Jacob et al. |
| 6,801,003 B2 | 10/2004 | Schanberger et al. |
| 6,806,659 B1 | 10/2004 | Mueller et al. |
| 6,831,569 B2 | 12/2004 | Wang et al. |
| 6,853,150 B2 | 2/2005 | Clauberg et al. |
| 6,853,151 B2 | 2/2005 | Leong et al. |
| 6,859,644 B2 | 2/2005 | Wang |
| 6,922,022 B2 | 7/2005 | Bucks et al. |
| 6,930,452 B2 | 8/2005 | De Krijger et al. |
| 6,932,477 B2 | 8/2005 | Stanton |
| 6,933,685 B2 | 8/2005 | Gutta et al. |
| 6,933,767 B2 | 8/2005 | Bucks et al. |
| 6,965,205 B2 | 11/2005 | Piepgras et al. |
| 6,969,954 B2 | 11/2005 | Lys |
| 6,972,525 B2 | 12/2005 | Bucks et al. |
| 6,975,079 B2 | 12/2005 | Lys et al. |
| 6,992,803 B2 | 1/2006 | Chang |
| 6,998,594 B2 | 2/2006 | Gaines et al. |
| 7,014,336 B1 | 3/2006 | Ducharme et al. |
| 7,030,572 B2 | 4/2006 | Nijhof et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,064,498 B2 | 6/2006 | Dowling et al. |
| 7,067,992 B2 | 6/2006 | Leong et al. |
| 7,071,762 B2 | 7/2006 | Xu et al. |
| 7,113,541 B1 | 9/2006 | Lys et al. |
| 7,118,248 B2 | 10/2006 | Wynne Willson |
| 7,132,804 B2 | 11/2006 | Lys et al. |
| 7,135,824 B2 | 11/2006 | Lys et al. |
| 7,139,617 B1 | 11/2006 | Morgan et al. |
| 7,140,752 B2 | 11/2006 | Ashdown |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,608 B2 | 4/2007 | Robinson et al. |
| 7,202,613 B2 | 4/2007 | Morgan et al. |
| 7,202,641 B2 | 4/2007 | Claessens et al. |
| 7,204,622 B2 | 4/2007 | Dowling et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,253,566 B2 | 8/2007 | Lys et al. |
| 7,255,457 B2 | 8/2007 | Ducharme et al. |
| 7,255,458 B2 | 8/2007 | Ashdown |
| 7,256,554 B2 | 8/2007 | Lys |
| 7,262,559 B2 | 8/2007 | Tripathi et al. |
| 7,267,461 B2 | 9/2007 | Kan et al. |
| 7,274,160 B2 | 9/2007 | Mueller et al. |
| 7,300,192 B2 | 11/2007 | Mueller et al. |
| 7,308,296 B2 | 12/2007 | Lys et al. |
| 7,309,965 B2 | 12/2007 | Dowling et al. |
| 7,314,289 B2 | 1/2008 | Montagne |
| 7,319,298 B2 | 1/2008 | Jungwirth et al. |
| 7,323,676 B2 | 1/2008 | Duijve |
| 7,329,998 B2 | 2/2008 | Jungwirth |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,929 B2 | 4/2008 | Mueller et al. |
| 7,358,961 B2 | 4/2008 | Zwanenburg |
| 7,387,405 B2 | 6/2008 | Ducharme et al. |
| 7,388,665 B2 | 6/2008 | Ashdown |
| 7,394,210 B2 | 7/2008 | Ashdown |
| 7,420,335 B2 | 9/2008 | Robinson et al. |
| 7,423,387 B2 | 9/2008 | Robinson et al. |
| 7,432,668 B2 | 10/2008 | Zwanenburg et al. |
| 7,443,209 B2 | 10/2008 | Chang |
| 7,449,847 B2 | 11/2008 | Schanberger et al. |
| 7,453,217 B2 | 11/2008 | Lys et al. |
| 7,459,864 B2 | 12/2008 | Lys |
| 7,462,997 B2 | 12/2008 | Mueller et al. |
| 7,463,070 B2 | 12/2008 | Wessels |
| 7,482,565 B2 | 1/2009 | Morgan et al. |
| 7,482,760 B2 | 1/2009 | Jungwirth et al. |
| 7,490,953 B2 | 2/2009 | Holten et al. |
| 7,490,957 B2 | 2/2009 | Leong et al. |
| 7,495,671 B2 | 2/2009 | Chemel et al. |
| 7,502,034 B2 | 3/2009 | Chemel et al. |
| 7,505,395 B2 | 3/2009 | Ashdown et al. |
| 7,507,001 B2 | 3/2009 | Kit |
| 7,511,436 B2 | 3/2009 | Xu |
| 7,511,437 B2 | 3/2009 | Lys et al. |
| 7,515,128 B2 | 4/2009 | Dowling |
| 7,520,634 B2 | 4/2009 | Ducharme et al. |

(56) References Cited

U.S. PATENT DOCUMENTS

| | | |
|---|---|---|
| 7,521,872 B2 | 4/2009 | Bruning |
| 7,538,499 B2 | 5/2009 | Ashdown |
| 7,542,257 B2 | 6/2009 | Mccormick et al. |
| 7,550,931 B2 | 6/2009 | Lys et al. |
| 7,550,935 B2 | 6/2009 | Lys et al. |
| 7,557,521 B2 | 7/2009 | Lys |
| 7,569,807 B2 | 8/2009 | Matheson |
| 7,572,028 B2 | 8/2009 | Mueller et al. |
| 7,573,209 B2 | 8/2009 | Ashdown et al. |
| 7,573,210 B2 | 8/2009 | Ashdown et al. |
| 7,573,729 B2 | 8/2009 | Elferich et al. |
| 7,598,681 B2 | 10/2009 | Lys et al. |
| 7,598,684 B2 | 10/2009 | Lys et al. |
| 7,598,686 B2 | 10/2009 | Lys et al. |
| 7,619,370 B2 | 11/2009 | Chemel et al. |
| 7,652,236 B2 | 1/2010 | Cortenraad et al. |
| 7,654,703 B2 | 2/2010 | Kan et al. |
| 7,656,366 B2 | 2/2010 | Ashdown |
| 7,658,506 B2 | 2/2010 | Dowling |
| 7,659,673 B2 | 2/2010 | Lys |
| 7,659,674 B2 | 2/2010 | Mueller et al. |
| 7,665,883 B2 | 2/2010 | Matheson |
| 7,667,409 B2 | 2/2010 | Geerts et al. |
| 7,675,238 B2 | 3/2010 | Cortenraad et al. |
| 7,687,753 B2 | 3/2010 | Ashdown |
| 7,688,002 B2 | 3/2010 | Ashdown et al. |
| 7,689,130 B2 | 3/2010 | Ashdown |
| 7,703,951 B2 | 4/2010 | Piepgras et al. |
| 7,710,369 B2 | 5/2010 | Dowling |
| 7,712,926 B2 | 5/2010 | Matheson |
| 7,714,521 B2 | 5/2010 | Qian |
| 7,731,387 B2 | 6/2010 | Cortenraad et al. |
| 7,731,389 B2 | 6/2010 | Draganov et al. |
| 7,731,390 B2 | 6/2010 | Van Gorkom et al. |
| 7,737,643 B2 | 6/2010 | Lys |
| 7,738,002 B2 | 6/2010 | Ashdown et al. |
| 7,740,375 B2 | 6/2010 | Zou et al. |
| 7,766,489 B2 | 8/2010 | Duine et al. |
| 7,766,518 B2 | 8/2010 | Piepgras et al. |
| 7,772,787 B2 | 8/2010 | Ashdown et al. |
| 7,777,427 B2 | 8/2010 | Stalker, III |
| 7,781,979 B2 | 8/2010 | Lys |
| 7,802,902 B2 | 9/2010 | Moss et al. |
| 7,806,558 B2 | 10/2010 | Williamson |
| 7,808,191 B2 | 10/2010 | Wu |
| 7,809,448 B2 | 10/2010 | Lys et al. |
| 7,810,974 B2 | 10/2010 | Van Rijswick et al. |
| 7,845,823 B2 | 12/2010 | Mueller et al. |
| 7,850,347 B2 | 12/2010 | Speier et al. |
| 7,854,539 B2 | 12/2010 | Van Duijneveldt |
| 7,868,562 B2 | 1/2011 | Salsbury et al. |
| 7,878,683 B2 | 2/2011 | Logan et al. |
| 7,878,688 B2 | 2/2011 | Paulussen et al. |
| 7,893,631 B2 | 2/2011 | Speier |
| 7,893,661 B2 | 2/2011 | Ackermann et al. |
| 7,894,050 B2 | 2/2011 | Ashdown et al. |
| 7,906,917 B2 | 3/2011 | Tripathi et al. |
| 7,911,151 B2 | 3/2011 | Xu |
| 7,914,173 B2 | 3/2011 | Paulussen et al. |
| 8,022,632 B2 | 9/2011 | Schulz et al. |
| 8,026,673 B2 | 9/2011 | Lys |
| 2002/0074559 A1 | 6/2002 | Dowling et al. |
| 2002/0196415 A1* | 12/2002 | Shiratani ............... G01B 11/25 348/E13.005 |
| 2003/0067774 A1* | 4/2003 | Lizotte ................... F21V 5/002 362/19 |
| 2003/0132721 A1 | 7/2003 | Jacobs et al. |
| 2003/0133292 A1 | 7/2003 | Mueller et al. |
| 2004/0052076 A1 | 3/2004 | Mueller et al. |
| 2004/0090191 A1 | 5/2004 | Mueller et al. |
| 2004/0178751 A1 | 9/2004 | Mueller et al. |
| 2005/0236998 A1 | 10/2005 | Mueller et al. |
| 2005/0275626 A1 | 12/2005 | Mueller et al. |
| 2006/0002110 A1 | 1/2006 | Dowling et al. |
| 2006/0076908 A1 | 4/2006 | Morgan et al. |
| 2006/0114201 A1 | 6/2006 | Chang |
| 2006/0152172 A9 | 7/2006 | Mueller et al. |
| 2006/0221606 A1 | 10/2006 | Dowling |
| 2006/0262521 A1 | 11/2006 | Piepgras et al. |
| 2006/0274526 A1 | 12/2006 | Weston et al. |
| 2006/0290624 A1 | 12/2006 | Ashdown |
| 2007/0063658 A1 | 3/2007 | Van Der Veeken |
| 2007/0086912 A1 | 4/2007 | Dowling et al. |
| 2007/0115658 A1 | 5/2007 | Mueller et al. |
| 2007/0145915 A1 | 6/2007 | Roberge et al. |
| 2007/0153514 A1 | 7/2007 | Dowling et al. |
| 2007/0230159 A1 | 10/2007 | Cortenraad et al. |
| 2007/0258240 A1 | 11/2007 | Ducharme et al. |
| 2007/0273290 A1 | 11/2007 | Ashdown et al. |
| 2008/0042599 A1 | 2/2008 | Ashdown |
| 2008/0043464 A1 | 2/2008 | Ashdown |
| 2008/0048582 A1 | 2/2008 | Robinson |
| 2008/0062413 A1 | 3/2008 | Ashdown et al. |
| 2008/0089060 A1 | 4/2008 | Kondo et al. |
| 2008/0094005 A1 | 4/2008 | Rabiner et al. |
| 2008/0122386 A1 | 5/2008 | De Brouwer et al. |
| 2008/0136331 A1 | 6/2008 | Schmeikal |
| 2008/0136796 A1 | 6/2008 | Dowling |
| 2008/0140231 A1 | 6/2008 | Blackwell et al. |
| 2008/0164826 A1 | 7/2008 | Lys |
| 2008/0164854 A1 | 7/2008 | Lys |
| 2008/0167734 A1 | 7/2008 | Robinson et al. |
| 2008/0183081 A1 | 7/2008 | Lys et al. |
| 2008/0239675 A1 | 10/2008 | Speier |
| 2008/0265797 A1 | 10/2008 | Van Doorn |
| 2008/0278092 A1 | 11/2008 | Lys et al. |
| 2008/0278941 A1 | 11/2008 | Logan et al. |
| 2008/0290251 A1 | 11/2008 | Deurenberg et al. |
| 2008/0297066 A1 | 12/2008 | Meijer et al. |
| 2008/0298330 A1 | 12/2008 | Leitch |
| 2008/0315798 A1 | 12/2008 | Diederiks et al. |
| 2009/0002981 A1 | 1/2009 | Knibbe |
| 2009/0021175 A1 | 1/2009 | Wendt et al. |
| 2009/0021182 A1 | 1/2009 | Sauerlaender |
| 2009/0072761 A1 | 3/2009 | Wessels |
| 2009/0128059 A1 | 5/2009 | Joosen et al. |
| 2009/0134817 A1 | 5/2009 | Jurngwirth et al. |
| 2009/0160364 A1 | 6/2009 | Ackermann et al. |
| 2009/0168415 A1 | 7/2009 | Franciscus Deurenberg et al. |
| 2009/0179587 A1 | 7/2009 | Van Der Veen et al. |
| 2009/0179596 A1 | 7/2009 | Willaert et al. |
| 2009/0189448 A1 | 7/2009 | Verschueren |
| 2009/0224695 A1 | 9/2009 | Van Erp et al. |
| 2009/0230884 A1 | 9/2009 | Van Doorn |
| 2009/0243507 A1 | 10/2009 | Lucero-Vera et al. |
| 2009/0278473 A1 | 11/2009 | Van Erp |
| 2009/0284174 A1 | 11/2009 | Sauerlander et al. |
| 2009/0321666 A1 | 12/2009 | Hilgers |
| 2010/0007600 A1 | 1/2010 | Deurenberg et al. |
| 2010/0026191 A1 | 2/2010 | Radermacher et al. |
| 2010/0045478 A1 | 2/2010 | Schulz et al. |
| 2010/0072901 A1 | 3/2010 | De Rijck et al. |
| 2010/0072902 A1 | 3/2010 | Wendt et al. |
| 2010/0079085 A1 | 4/2010 | Wendt et al. |
| 2010/0079091 A1 | 4/2010 | Deixler et al. |
| 2010/0084995 A1 | 4/2010 | Baaijens et al. |
| 2010/0091488 A1 | 4/2010 | Ijzerman et al. |
| 2010/0094439 A1 | 4/2010 | Van De Meulenhof et al. |
| 2010/0102732 A1 | 4/2010 | Peeters et al. |
| 2010/0117543 A1 | 5/2010 | Van Der Veen et al. |
| 2010/0117656 A1 | 5/2010 | Snelten |
| 2010/0118531 A1 | 5/2010 | Montagne |
| 2010/0127633 A1 | 5/2010 | Geerts et al. |
| 2010/0134041 A1 | 6/2010 | Radermacher et al. |
| 2010/0134042 A1 | 6/2010 | Willaert |
| 2010/0148689 A1 | 6/2010 | Morgan et al. |
| 2010/0164399 A1 | 7/2010 | Radermacher et al. |
| 2010/0165618 A1 | 7/2010 | Vissenberg et al. |
| 2010/0171771 A1 | 7/2010 | Otte et al. |
| 2010/0181936 A1 | 7/2010 | Radermacher et al. |
| 2010/0188007 A1 | 7/2010 | Deppe et al. |
| 2010/0194293 A1 | 8/2010 | Deurenberg et al. |
| 2010/0231133 A1 | 9/2010 | Lys |
| 2010/0231363 A1 | 9/2010 | Knibbe |

(56) References Cited

U.S. PATENT DOCUMENTS

| | | | |
|---|---|---|---|
| 2010/0244707 A1 | 9/2010 | Gaines et al. | |
| 2010/0244734 A1 | 9/2010 | Van Herpen et al. | |
| 2010/0245270 A1* | 9/2010 | Nako | H04N 1/00129 345/173 |
| 2010/0259182 A1 | 10/2010 | Man et al. | |
| 2010/0264834 A1 | 10/2010 | Gaines et al. | |
| 2010/0271843 A1 | 10/2010 | Holten et al. | |
| 2010/0289532 A1 | 11/2010 | Wendt et al. | |
| 2010/0301780 A1 | 12/2010 | Vinkenvleugel | |
| 2010/0308745 A1 | 12/2010 | Delnoij | |
| 2011/0025205 A1 | 2/2011 | Van Rijswick et al. | |
| 2011/0025230 A1 | 2/2011 | Schulz et al. | |
| 2011/0035404 A1 | 2/2011 | Morgan et al. | |
| 2011/0042554 A1 | 2/2011 | Hilgers et al. | |
| 2011/0090684 A1 | 4/2011 | Logan et al. | |
| 2011/0095694 A1 | 4/2011 | Justel et al. | |
| 2011/0285292 A1 | 11/2011 | Mollnow et al. | |
| 2011/0291812 A1 | 12/2011 | Verbrugh | |
| 2012/0019670 A1 | 1/2012 | Chang et al. | |
| 2012/0095745 A1* | 4/2012 | Le Guevel-Scholtens | H05B 47/155 703/13 |
| 2013/0214698 A1* | 8/2013 | Aliakseyeu | H05B 47/19 315/292 |
| 2015/0296589 A1* | 10/2015 | Melanson | H05B 45/40 315/151 |
| 2015/0379594 A1* | 12/2015 | Sallee | G06V 20/36 705/412 |
| 2016/0270718 A1* | 9/2016 | Heneghan | G16H 50/30 |
| 2016/0335698 A1* | 11/2016 | Jones | G06Q 30/0629 |
| 2017/0064790 A1* | 3/2017 | Clark | F21S 8/046 |
| 2018/0160490 A1* | 6/2018 | Li | H05B 47/16 |
| 2019/0012750 A1* | 1/2019 | Caicedo Fernandez | H05B 45/10 |
| 2019/0019324 A1* | 1/2019 | Wu | G06T 19/20 |
| 2020/0107423 A1* | 4/2020 | Harrison | G06T 7/55 |
| 2020/0209712 A1* | 7/2020 | Hu | H04N 23/56 |
| 2022/0408012 A1* | 12/2022 | Hwang | G06T 5/60 |
| 2023/0052462 A1* | 2/2023 | Harrison | G06T 15/506 |

OTHER PUBLICATIONS

ATAVRFBKIT/EVLB001 User Guide, "Dimmable Fluorescent Ballast", ATMEL, 2007, 35 pages.
Barberis, C., "Precision current sink costs less than $20," EDN Design Ideas, vol. 43, No. 6, Mar. 13, 1998, 2 pages.
Bellcomb Technologies Incorporated, "Edges, Joiners, Attachments," retrieved from http://www.bellcomb.com/caps/edges.htm, Apr. 22, 2007, 3 pages.
Bookmarks Menu, "Controllers / Wireless," Dec. 6, 2012, 1 page.
Bowling, S., "Buck-Boost LED Driver Using the PIC16F785 MCU," Microchip, 2006, 12 pages.
By Staff—Consulting-Specifying Engineer, "DALI Delivers Control and Cost Savings, Headaches Too," Consulting-Specifying Engineer, Jun. 1, 2002, 2 pages.
Canny, D., "Controlling slew times tames EMI in offline supplies", EDN Design Ideas, Nov. 14, 2002.
Control Freak, "Addict Data," Creative Lighting, 2008, 5 pages.
Curtis, K., "High Power IR LED Driver Using the PIC16C781/782," Microchip, 2002, 8 pages.
Cybrotech, "Managing Lights with Dali," Cybrotech Ltd., 2007, 11 pages.
Cypress Perform, "Implementing an Integrated DMX512 Receiver," Cypress Semiconductor Corporation, Dec. 16, 2009, 1 page.
Cypress Perform, "PowerPSoC (R) Intelligent LED Driver," Cypress Semiconductor Corporation, Jul. 20, 2009, 52 pages.
Dali, "Dali at work," News & Events, Apr. 8, 2010, 1 page.
Dali, "Dali-Protocol," Davmark Group, 2007, 6 pages.
Davidovic et al., "Lead-Acid Battery Charger Becomes A Subfunction In A Microcontroller," The Authority on Emerging Technologies for Design Solutions, Mar. 29, 2007, 2 pages.
Di Jasio, L., "A Technique to Increase the Frequency Resolution of PICmicro MCU PWM Modules," Microchip, 2006, 10 pages.
Dietz et al., "Very Low-Cost Sensing and Communication Using Bidirectional LEDs," Mitsubishi Electric Research Laboratories, Jul. 2003, 19 pages.
Distler, T., "LED Effects Stream TM v2.0 Protocol (Revision C)," Jun. 2, 2005, 5 pages.
Dunn, J., "Matching MOSFET Drivers to MOSEFTs," Microchip, 2004, 10 pages.
Fosler et al., "Digitally Addressable DALI Dimming Ballast," Microchip, 2002, 18 pages.
Fosler, R., "The RS-232/DALI Bridge Interface," Microchip, 2002, 8 pages.
Fosler, R., "Use a microcontroller to design a boost converter," EDN design ideas, Mar. 4, 2004, pp. 74-75.
Ghulyani, L., "Simple MPPT-Based Lead Acid Charger Using bq2031," Texas Instruments, Dec. 3, 2009, 5 pages.
Goder, D., "Scheme provides high-side current sensing for white-LED drivers," EDN design ideas, Feb. 19, 2004, 1 page.
Google Search Results for, "dali query group," retrieved from http://www.google.com/search?hl=en&client=firefox-a&rls=org.mozilla:en—on Apr. 8, 2010, 2 pages.
Hardwick, M., "DC power wire also carries clock or data," EDN Design Ideas, Mar. 13, 1998, 1 page.
Hexcel Composites, "Sandwich Panel Fabrication Technology," retrieved from http://www.hexcel.com/NR/rdonlyres/B4574C2C-0644-43AC-96E2-CC15967A4b)5/4547 Sandwich Fabrication.pdf, dated Jan. 1997, 16 pages.
Jackson, S., "Circuit protects bus from 5V swings," EDN Design Ideas, Nov. 14, 2002, p. 102.
Klepin, K., "Temperature Compensation for High Brightness LEDs using EZ-Color (TM) and PSoC Express," Cypress Perform, Aug. 10, 2007, 4 pages.
Kremin et al., "Multichannel LED Dimmer with CapSense Control—AN13943," Cypress Perform, Jul. 20, 2007, 5 pages.
Kropf, B., "Firmware—RGB Color Mixing Firmware for EZ-Color (TM)—AN16035," Cypress Perform, Jun. 13, 2007, 7 pages.
Lager, A., "Use a 555 timer as a switch-mode power supply," EDN Design Ideas, Nov. 14, 2002, 1 page.
Lee, M., "Shunt Battery Charger Provides 1A Continuous Current," EDN Design Ideas, Nov. 20, 1997, 2 pages.
Locher, R., "Introduction to Power MOSEFETs and their Applications," Fairchild Semiconductor (TM), Oct. 1998, 15 pages.
Miller, R., "Digital addressable lighting interface protocol fosters systems interoperability for lower costs and greater design flexibility," RNM Engineering, Inc., Apr. 1, 2003, 20 pages.
Mixed-Signal Design Guide, "1-Wire Products Deliver a Powerful Combination . . . ," Dallas Semiconductor Maxim, 2005, 7 pages.
Nell, S., "VCO uses programmable logic," EDN Design Ideas, Nov. 14, 2002, 1 page.
O'Loughlin, M., "350-W, Two-Phase Interleaved PFC Pre-regulator Design Review," Texas Instruments, Mar. 2007, 21 pages.
O'Loughlin, M., "PFC Pre-Regulator Frequency Dithering Circuit," Texas Instruments, May 2007, 8 pages.
Operating Manual, "DALI to DMX Dekoder 7064A-H Mk1," Soundlight, 2008, 8 pages.
OWL2c and conductivity, "Conductivity with the BS2/OWL2," EME Systems, Berkeley CA U.S.A., 2002, 3 pages.
Perrin, R., "Inexpensive Relays Form Digital Potentiometer," EDN Design Ideas, 1998, 2 pages.
Petersen, A., "Harness solar power with smart power-conversion techniques," EDN designfeature, Feb. 4, 1999, pp. 119-124.
Prendergast, P., "How to Design a Three-Channel LED Driver," Cypress Perform, Jan. 2008, 9 pages.
R8C/25, "Demonstration Example for DALI Lighting Protocol Stack," Renasas, Jul. 2008, 14 pages.
Richardson, C., "LM3404 Driving a Seoul Semi Zpower P4 1A LED—RD-I34," National Semiconductor, Apr. 2007, 6 pages.
Richardson, C., "Matching Driver to LED," National Semiconductor, Jan. 2008, 5 pages.
Rogers, E., "Understanding Boost Power Stages in Switchmode Power Supplies," Texas Instruments, Mar. 1999, 32 pages.

(56) References Cited

OTHER PUBLICATIONS

Rogers, E., "Understanding Buck Power Stages in Switchmode Power Supplies," Texas Instruments, Mar. 1999, 36 pages.

Seattle Robotics Society, "Implementing Infrared Object Detection," retrieved from http://web.archive.org/web/20080528042614rejwww.seattlerobotics.org/guide/infrared.html on Apr. 7, 2010, 4 pages.

Shanmugam, S., "Design of a linear Fresnel lens system for solar photovoltaic electrical power source," Center for Robotics Research, Oct. 5, 2001, 8 pages.

Shill, M., "Simple logic probe uses bicolor LED," EDN Design Ideas, Mar. 13, 1998, 2 pages.

Software Design Specification, "Z-Wave Protocol Overview," Zensys, May 9, 2007, 20 pages.

Takahashi A., "Methods and Features of LED Drivers," Electronic Products, Mar. 2008, 3 pages.

UPB Universal Powerline Bus, "Universal Powerline Bus Communication Technology Overview," PCS Powerline Control Systems, Jan. 8, 2002, 13 pages.

UPB Universal Powerline Bus, "UPB Technology Description," PCS Powerline Control Systems, Apr. 16, 2007, 68 pages.

Van Dorsten, A., "A Low Cost Step-up Converter by IC 555," Circuit Project Electronic, Jul. 21, 2007, 2 pages.

Walma, K., "DALI: Forerunner of Today's Breakthrough Lighting Technology," Consulting-Specifying Engineer, Feb. 20, 2007, 2 pages.

Wikipedia, "Digital Addressable Lighting Interface," retrieved from http://en.wikipedia.org/wikiJDigital_Addressable_Lighting_Interface accessed on Apr. 8, 2010, 3 pages.

Witt, J., "Switched-capacitor regulator provides gain," EDN Design Ideas, Mar. 13, 1998, 2 pages.

Wojslaw, C., "DPP adds versatility to VFC," EDN Design Ideas, Nov. 14, 2002, 1 page.

Young, R., "Power circuit terminates DDR DRAMs," EDN Design Ideas, Nov. 14, 2002, 1 page.

Z-Wave Vizia Etc thread, "Aspire Control System Wins Major Design Awards," retrieved from http://groups.google.com/group/comp.home.automation/browse_thread/thread/449c2c66934dfSfb/fSI12116a8231aa1?lnk=st&q=z-wave&rnum=98#fSI12116a8231aa1, www.ztech.com, dated Sep. 10, 2007, 18 pages.

Zarr, R., "Driving High-Power LEDs," Machine Design, Oct. 2007, 3 pages.

Zensys, "ASCII Interface," Vizia RF, 2007, 12 pages.

ZXCT 1009, "High-Side Current Monitor," Zetex, Apr. 2001, 8 pages.

* cited by examiner

Create New Project
Please enter contact details below

Client Name*
[name]                    + Add

Address*
[address]

Address #2
[address #2]

City*     State*    Zip Code*
[city]    [state]   [zip]

Email
[email]

Project Name*
[project name]

Attention:
[name]

Payment Terms
[payment terms]

Discount
[#%]

Ship via
[name]

Specifier*
[name]                    + Add

○ To be coordinated with project schedule
○ 3-5 Weeks*
○ 4-6 Weeks*
○ 4-6 Weeks after receipt of released order and drawings
○ 5-7 Weeks*
○ To be coordinated with project schedule
Custom Lead Time
[# weeks]

Notes
[notes]

Select the type of document to create within the project*

⦿ New Specification — 202
⦿ New Quote — 204
⦿ New Drawing — 206

[Create]   [Cancel]

My Orders Panel

- My Orders (10)
- Deleted Orders (16)
- Archived Orders (7)
- Support

Search | Dashboard | (name)

| PROJECT | APPROVED | VALIDATED | SHIP DATE | STATUS | COMPLETED | ARCHIVE |
|---|---|---|---|---|---|---|
| [project] [number] [email address] > | [date] | [date] | [date] | ●—●—○—○ Production | > | ▣ |
| ... > | ... | ... | ... | ●—○—○—○ Starting | > | ▣ |
| ... > | ... | ... | ... | ●—○—○—○ Production | > | ▣ |
| ... > | ... | ... | ... | ●—○—○—○ Production | > | ▣ |
| ... > | ... | ... | ... | ●—○—○—○ Production | > | ▣ |
| [project] [number] [email address] > | [date] | [date] | [date] | ●—○—○—○ Production | > | ▣ |

Log Out | Support

FIG. 9

SYSTEMS AND METHODS FOR MANUFACTURING LIGHT FIXTURES

FIELD OF THE DISCLOSURE

This disclosure relates generally to systems and methods for manufacturing light fixtures. In particular, the systems and methods of this disclosure can generate a light fixture configuration according to a layout for a lighting system.

BACKGROUND

Users can select desired features of light fixtures from a specification provided by an entity (e.g., manufacturer or distributor). The users can provide the selected features in the specification to the manufacturer for manufacturing the light fixtures. Based on the selected features, the manufacturer may manufacture the light fixtures for the installation of a lighting system.

BRIEF SUMMARY OF THE DISCLOSURE

Systems and methods of this disclosure are directed to manufacturing light fixtures. Entities, such as manufacturers or distributors, can provide end users with a predefined or static specification including selectable attributes for a lighting system. The attributes may include types of products, types of technology (e.g., luminescent type), type of mount, power consumption (e.g., per foot of lighting fixture), dimension of lighting fixture, color rendering index (CRI), or color temperature (CCT), among others. The users can select desired attributes of the light fixture to request for production or distribution from the entity. However, it may be challenging to accurately determine the compatibility between the different attributes and select these attributes based on the static specification. In particular, the static specification may include all information related to all types of light fixtures, even information unrelated to certain attributes selected by the user. For example, the user may select a certain mounting type for the light fixtures and various features of the light fixtures for installation using the mounting type. Depending on the mounting type, certain features may be available or unavailable. In this case, the user may wait for approval from the entity given the potential compatibility issues, thereby consuming extensive time and excessive resources (e.g., network resources from iterative communications, storage/memory for storing specifications with unnecessary information, etc.) to finalize the configuration of the light fixtures and initiate production or distribution. Further, although light fixtures with the specified features may be available, the user may select certain lengths and types of light fixtures that cause discrepancies with the desired layout for a lighting system installation, such as undesirable gaps between the light fixtures, insufficient power feeds, etc.

The systems and methods of this technical solution can include a data processing system configured to dynamically provide compatible attributes or features depending on the selection of one or more attribute(s) and select various light fixtures according to a configurable layout for lighting system installation and the selected attributes to satisfy a gap constraint. For example, the data processing system can provide a graphical user interface (GUI) to a client device of the user via an application launched on the client device. The data processing system can receive at least one of the type of product (e.g., compose, graphite, runway, etc.) or the type of technology (e.g., tunable, static, dim-warm, sunset-dim, etc.) for the lighting system selected via the GUI. The data processing system can determine the types of attributes (e.g., power, voltage, CCT, CRI, finish, control, etc.) that are available according to the selected type of product or type of technology. The data processing system can adjust the available types of attributes in response to certain attribute(s) being selected or changes made to any of the selections for compatibility between the attributes. The data processing system can store the selected attributes as part of a configuration for light fixtures in a data repository.

In further example, the data processing system can detect a layout for installation of the lighting system input by the user via the GUI. The data processing system can select the various light fixtures according to the layout and the configuration (or other configuration(s) specified by the user) that satisfies a gap constraint when the light fixtures are electrically coupled. The gap constraint can refer to the maximum distance between the light fixtures. The data processing system can select different lengths or shapes of light fixtures having the attributes to satisfy the layout and the gap constraint. Hence, by utilizing the data processing system to dynamically select the light fixtures that conform with the specified layout, gap constraint, and compatible attributes, the systems and methods can digitize and expedite the specification process, thereby avoiding erroneous selections of incompatible features, enhancing user experience in the selection and installation of the lighting system via the configurable layout, and reducing resource consumption from iterative communications between the user and the entity when selecting features using the static specification.

In one aspect, this disclosure is directed to a method for manufacturing light fixtures. The method can include identifying, by a data processing system comprising one or more processors and memory, a plurality of attributes of a lighting system. The plurality of attributes can include at least one of a luminescent type, a mounting type, or a luminescent feature. The method can include detecting, by the data processing system responsive to input via a graphical user interface, a layout for installation of the lighting system. The method can include selecting, by the data processing system using a model configured to satisfy a gap constraint, a plurality of light fixtures based on the layout and the plurality of attributes that, when electrically coupled to conform to the layout, satisfy the gap constraint. The method can include providing, by the data processing system, an instruction to cause manufacturing of the selected plurality of light fixtures in accordance with the layout and the plurality of attributes.

The method can include providing, by the data processing system via the graphical user interface, a digital blueprint of a physical space in which the lighting system is to be installed. The method can include detecting, by the data processing system responsive to input via the graphical user interface, a plurality of coordinates on the digital blueprint for installation of the lighting system. The method can include generating, by the data processing system, the layout based on the plurality of coordinates on the digital blueprint.

The method can include detecting, by the data processing system responsive to input via the graphical user interface, the layout comprising a first dimension and a second dimension that is perpendicular with the first dimension. The method can include selecting, by the data processing system, the plurality of light fixtures comprising a first light fixture with a first run size and a straight run, a second light fixture with a second run size and an L-shape, and a third light fixture with a third size and the straight run. The first light fixture can be electrically coupled to the third light fixture via the second light fixture.

The method can include selecting, by the data processing system, the model from a plurality of models based on at least one of the plurality of attributes. The method can include selecting, by the data processing system, the model from a plurality of models based on the mounting type and the luminescent feature.

The method can include selecting, by the data processing system, the model to satisfy a unit of energy per distance ratio. The method can include selecting, by the data processing system, the plurality of light fixtures comprising a first light fixture and a second light fixture having a different configuration than the first light fixture. The different configuration can include at least one of a length or a shape.

The method can include selecting, by the data processing system, at least a portion of the plurality of light fixtures responsive to detecting, via the graphical user interface, at least a portion of the layout for installation prior to completion of the layout for installation. The method can include providing, by the data processing system, for render via the graphical user interface prior to completion of the layout for installation, the at least the portion of the plurality of light fixtures.

The method can include identifying, by the data processing system, the plurality of attributes comprising an emergency lighting type. The method can include identifying, by the data processing system, a direction for lighting and a number of power feeds for the layout. The method can include selecting, by the data processing system, the plurality of light fixtures based on the direction and the number of power feeds.

The method can include determining, by the data processing system, the plurality of light fixtures selected via the model exceeds a power threshold. The method can include adding, by the data processing system, a second power feed responsive to the determination.

In another aspect, this disclosure is directed to a system for manufacturing light fixtures. The system can include a data processing system comprising one or more processors, coupled with memory. The data processing system can identify a plurality of attributes of a lighting system. The plurality of attributes can include at least one of a luminescent type, a mounting type, or a luminescent feature. The data processing system can detect, responsive to input via a graphical user interface, a layout for installation of the lighting system. The data processing system can select, via a model configured to satisfy a gap constraint, a plurality of light fixtures based on the layout and the plurality of attributes that, when electrically coupled to conform to the layout, satisfy the gap constraint. The data processing system can provide an instruction to cause manufacturing of the selected plurality of light fixtures in accordance with the layout and the plurality of attributes.

The data processing system can provide, via the graphical user interface, a digital blueprint of a physical space in which the lighting system is to be installed. The data processing system can detect, responsive to input via the graphical user interface, a plurality of coordinates on the digital blueprint for installation of the lighting system. The data processing system can generate the layout based on the plurality of coordinates on the digital blueprint. For example, the data processing system can perform automated drawing creation from existing PDF or CAD files. To do so, the data processing system can receive, from a user upload, a drawing and a selection of a line on the drawing that is intended by the architect to depict a lighting type. The data processing system can then identify and converting that bitmap or vector into dimensions and subsequent light fixtures.

The data processing system can detect, responsive to input via the graphical user interface, the layout comprising a first dimension and a second dimension that is perpendicular with the first dimension. The data processing system can select the plurality of light fixtures comprising a first light fixture with a first run size and a straight run, a second light fixture with a second run size and an L-shape, and a third light fixture with a third size and the straight run. The first light fixture can be electrically coupled to the third light fixture via the second light fixture.

The data processing system can select the model from a plurality of models based on at least one of the plurality of attributes. The data processing system can select the plurality of light fixtures comprising a first light fixture and a second light fixture having a different configuration than the first light fixture.

The data processing system can determine the plurality of light fixtures selected via the model exceeds a power threshold. The data processing system can add a second power feed responsive to the determination.

In yet another aspect, this disclosure is directed to a non-transitory computer readable storage medium. The non-transitory computer readable storage medium can store instructions that, when executed by one or more processors, cause the one or more processors to identify a plurality of attributes of a lighting system. The plurality of attributes can include at least one of a luminescent type, a mounting type, or a luminescent feature. The instructions can cause the one or more processors to detect, responsive to input via a graphical user interface, a layout for installation of the lighting system. The instructions can cause the one or more processors to select, via a model configured to satisfy a gap constraint, a plurality of light fixtures based on the layout and the plurality of attributes that, when electrically coupled to conform to the layout, satisfy the gap constraint. The instructions can cause the one or more processors to provide an instruction to cause manufacturing of the selected plurality of light fixtures in accordance with the layout and the plurality of attributes.

The instructions can include instructions to provide, via the graphical user interface, a digital blueprint of a physical space in which the lighting system is to be installed. The instructions can include instructions to detect, responsive to input via the graphical user interface, a plurality of coordinates on the digital blueprint for installation of the lighting system. The instructions can include instructions to generate the layout based on the plurality of coordinates on the digital blueprint.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE FIGURES

The accompanying drawings are not intended to be drawn to scale. Like reference numbers and designations in the various drawings indicate like elements having similar structure or functionality. For purposes of clarity, not every component may be labeled in every drawing. In the drawings:

FIGS. 2-9 are example GUIs to select the light fixtures for a lighting system, in accordance with an implementation;

Figure 1:
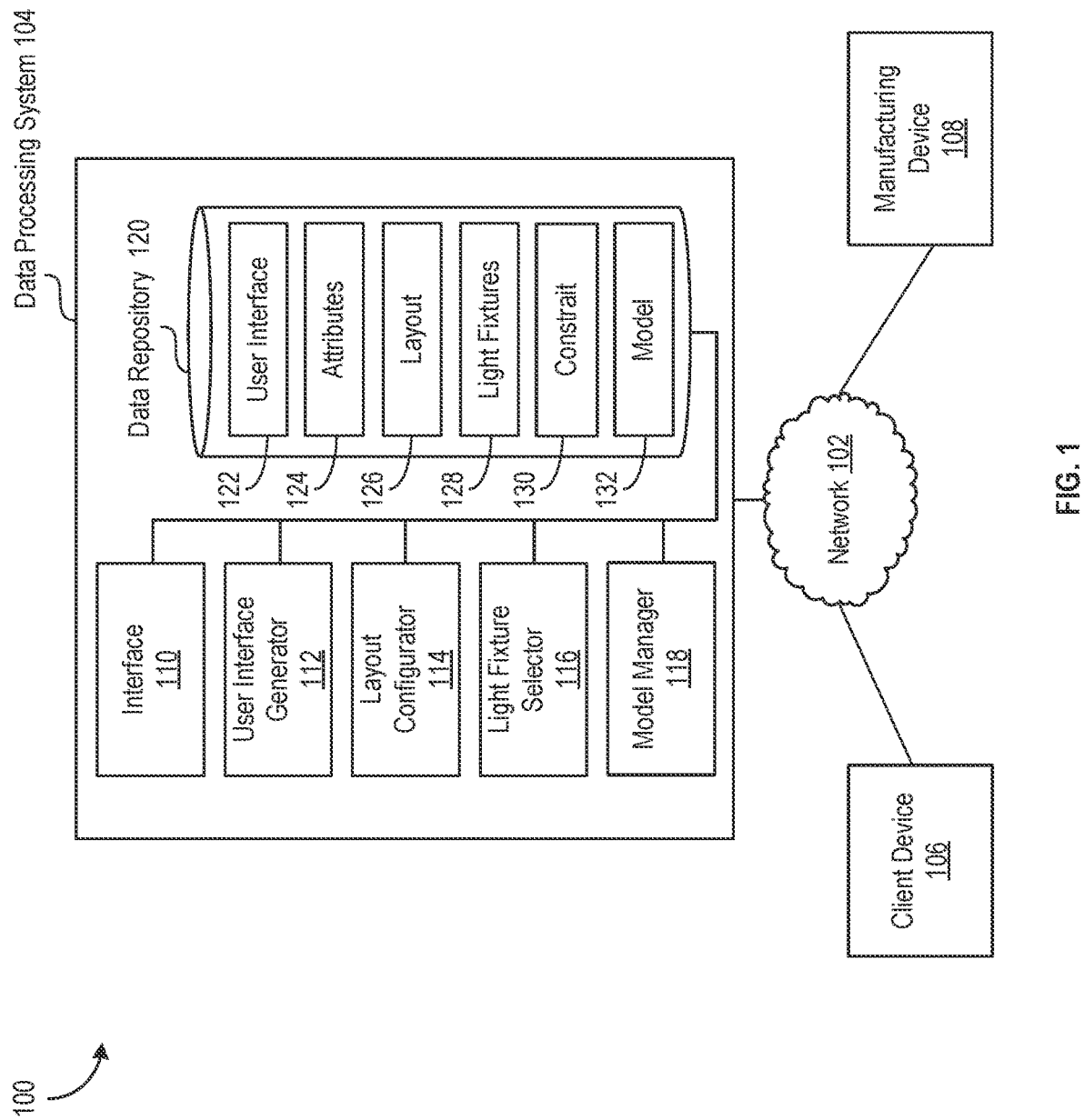
FIG. 1 is a block diagram of an example system for manufacturing light fixtures, in accordance with an implementation.

The features and advantages of the present solution will become more apparent from the detailed description set forth below when taken in conjunction with the drawings, in which like reference characters identify corresponding elements throughout. Other features, aspects, and advantages of the subject matter will become apparent from the description, the drawings, and the claims.

DETAILED DESCRIPTION

Following below are more detailed descriptions of various concepts related to, and implementations of, methods, apparatuses, and systems of manufacturing light fixtures. The various concepts introduced above and discussed in greater detail below may be implemented in any of numerous ways.

Lighting manufacturers or distributors (e.g., entities) can provide light fixtures to users according to the attributes of a lighting system selected in a specification (e.g., light fixture specification predefined by the manufacturer or distributor). The specification provided by these entities may be static, including all attributes or other information regarding various types of lighting fixtures. However, certain attributes may not be compatible with each other or may not be available because of, for instance, power restrictions between different types of technologies, available attributes associated with certain types of products or technologies, available lengths for certain types of technology, etc. Further, even with the user-selected attributes for the light fixtures, electrical connections between these light fixtures may not conform to the desired layout for lighting system installation due to unaccounted gaps between the light fixtures, power limit for each run of light fixtures, or inaccurate length estimation by the user, to list a few. To address the error-prone process of selecting attributes/configurations for the lighting system from the static specification, the system can digitize the specification by providing a graphical user interface (GUI) to a client device configured to receive user input and dynamically display available or compatible attributes responsive to the selected attribute(s). The system can provide a digital blueprint via the GUI to enable the user to generate, customize, or otherwise update the desired layout of the lighting system. The system can use a model configured to satisfy various constraints to generate the layout, such as gap constraint, light fixture availability constraint, configuration constraint, or power constraint, among others. Thus, the system can expedite the specification process by digitizing the specification using the model, thereby avoiding the erroneous selection of attributes, enhancing user experience in the selection and installation of the lighting system via the configurable layout, and reducing resource consumption from iterative communications between the user and the entity to obtain approval for the light fixtures.

Referring now to FIG. 1, a block diagram of an example system 100 for manufacturing light fixtures is shown. The system 100 can include at least one network 102, at least one data processing system 104, at least one client device 106, and at least one manufacturing device 108. The components (e.g., network 102, data processing system 104, client device 106, or manufacturing device 108) of the system 100 can include or be composed of hardware, software, or a combination of hardware and software components. The one or more components (e.g., data processing system 104, client device 106, or manufacturing device 108) of the system 100 can establish communication channels or transfer data via the network 102. For example, the client device 106 can communicate with at least one of the data processing system 104 or the manufacturing device 108 via the network 102. In another example, the data processing system 104 can communicate with other devices, such as the client device 106 or the manufacturing device 108 via the network 102. The communication channel between various different network devices can communicate with each other via the network 102 or different networks 102.

The network 102 can include computer networks such as the Internet, local, wide, metro or other area networks, intranets, satellite networks, other computer networks such as voice or data mobile phone communication networks, and combinations thereof. The network 102 may be any form of computer network that can relay information between the one or more components of the system 100. The network 102 can relay information between client devices 106 and one or more information sources, such as web servers or external databases, amongst others. In some implementations, the network 102 may include the Internet and/or other types of data networks, such as a local area network (LAN), a wide area network (WAN), a cellular network, a satellite network, or other types of data networks. The network 102 may also include any number of computing devices (e.g., computers, servers, routers, network switches, etc.) that are configured to receive and/or transmit data within the network 102. The network 102 may further include any number of hardwired and/or wireless connections. Any or all of the computing devices described herein (e.g., data processing system 104, client device 106, or manufacturing device 108) may communicate wirelessly (e.g., via Wi-Fi, cellular, radio, etc.) with a transceiver that is hardwired (e.g., via a fiber optic cable, a CAT5 cable, etc.) to other computing devices in the network 102. Any or all of the computing devices described herein (e.g., data processing system 104, client device 106, or manufacturing device 108) may also communicate wirelessly with the computing devices of the network 102 via a proxy device (e.g., a router, network switch, or gateway).

The client device 106 can include at least one processor and a memory, e.g., a processing circuit. The client device 106 can include various hardware or software components, or a combination of both hardware and software components. The client device 106 can be constructed with hardware or software components. For example, the client device 106 can include, but is not limited to, a television device, a mobile device, smart phone, personal computer, a laptop, a gaming device, a kiosk, or any other type of computing device. The client device 106 can be operated, used, or accessible by the user.

The client device 106 can include at least one interface for establishing a connection to the network 102. The client device 106 can communicate with other components of the system 100 via the network 102, such as the manufacturing device 108 or the data processing system 104. For example, the client device 106 can communicate data packets with the manufacturing device 108 via the network 102. The client device 106 can communicate with the data processing system 104 via the network 102. In some cases, the client device 106 can communicate with other client devices 106 communicatively coupled to the network 102.

The client device 106 can include, store, execute, or maintain various application programming interfaces ("APIs") in the memory (e.g., local to the client device 106). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol. The client device 106 can use at least one of various protocols for communication with the data processing system 104. The protocol can include at least a transmission control protocol ("TCP"), a user datagram protocol ("UDP"), or an internet control message protocol ("ICMP"). The communicated data can include a message, a content, a request, or otherwise information to be transmitted from the client device 106 to other devices in the network 102.

The manufacturing device 108 can be a computing device operated by an entity (e.g., manufacturer or distributor). The manufacturing device 108 can be in electrical communication with equipment for manufacturing light fixtures. In some cases, the manufacturing device 108 can be in electrical communication with equipment for obtaining, gathering, sorting, packing, or otherwise distributing the light fixtures to the user. The manufacturing device 108 can be composed of hardware or software components, or a combination of both hardware or software components. The manufacturing device 108 can be in communication with the data processing system 104 via the network 102. The manufacturing device 108 can be in communication with the client device 106 via the network 102.

The manufacturing device 108 can receive various instructions from the data processing system 104 or the client device 106. The instruction can include manufacturing one or more light fixtures selected or requested by the user. For example, in response to receiving the instruction, the manufacturing device 108 can command at least one manufacturing equipment to initiate a manufacturing process for the one or more light fixtures. The instruction can include sorting or grouping the light fixtures according to a particular run of light fixtures, the lighting system of a project, types of selected light fixtures, or other organization categories specified by the user. For example, in response to receiving the instruction, the manufacturing device 108 can command the distribution equipment to collect the selected light fixtures (e.g., stored in physical storage space or inventory of the entity) and pack the light fixtures for distribution to the user.

The manufacturing device 108 can communicate with at least the data processing system 104 or the client device 106 to update the availability of light fixtures. The manufacturing device 108 can communicate with at least the data processing system 104 or the client device 106 to update compatibilities between attributes of the lighting system (e.g., including luminescent features of the light fixtures). In some cases, the manufacturing device 108 can push or send the updates to an application used by the data processing system 104 or the client device 106 to access the GUI for selecting attributes or generating the layout of the lighting system. For instance, the manufacturing device 108 can be in communication with the data processing system 104 and the client device 106 via the application. The application can be accessed or modified by an administrator (e.g., entity) of the manufacturing device 108. The manufacturing device 108 can update the light fixture availability and attributes compatibilities in real-time via the application, such as in response to light fixtures added or removed from the inventory of the entity. The updates can be reflected in the application accessed by the client device 106 and shown to the user via the GUI of the application.

In some cases, the manufacturing device 108 can delegate management of the application (e.g., updating product availability or attribute compatibility, etc.) to the data processing system 104. For instance, subsequent to receiving instructions to manufacture or distribute a number of light fixtures from the data processing system 104, the manufacturing device 108 can respond or send an acknowledgment to the data processing system 104, thereby allowing the data processing system 104 to remove the specified number of light fixtures from availability. In another example, the data processing system 104 can receive input data from the administrator indicating adjusted compatibilities between different attributes, such as adding compatibility support or removing compatibility support. In this case, the data processing system 104 can transmit the indication of adjusted compatibilities to the data processing system 104, enabling the data processing system 104 to update compatibilities between the attributes in the application. In some arrangements, the manufacturing device 108 can include or be a part of the data processing system 104 to perform certain features similar to the data processing system 104.

The data processing system 104 can include various components to digitize the specification for the user and provide a digital blueprint for configuring and visualizing the layout of the lighting system in a physical space. The data processing system 104 can include at least one interface 110, at least one user interface generator 112, at least one layout configurator 114, at least one light fixture selector 116, at least one model manager 118, and at least one data repository 120. The data repository 120 can include at least one user interface storage 122, at least one attribute storage 124, at least one layout storage 126, at least one light fixture storage 128, at least one constraint storage 130, and at least one model storage 132. Individual components (e.g., interface 110, user interface generator 112, layout configurator 114, light fixture selector 116, model manager 118, or data repository 120) of the data processing system 104 can be composed of hardware, software, or a combination of hardware and software components. Individual components of the data processing system 104 can be in electrical communication with each other. For instance, the interface 110 can exchange data or communicate with the user interface generator 112, layout configurator 114, light fixture selector 116, model manager 118, or data repository 120. The one or more components of the data processing system 104 can be used to perform features or functionalities, such as generating the GUI, configuring the layout for the lighting system, selecting the light fixtures for the lighting system, managing the models, or storing lighting systems configured by the users via the GUI. The data processing system 104 can operate remotely from the client device 106, the manufacturing device 108, or other devices in the system 100. In some cases, the data processing system 104 can operate locally to the manufacturing device 108 or certain other devices in the system 100.

In some cases, the data processing system 104 can be a part of the manufacturing device 108, such as an integrated device, embedded device, a server-operated device, or a device accessible by the administrator of the manufacturing device 108. For example, the data processing system 104 can perform operations local or on-premise to the manufacturing device 108, such as processing inputs from the client device 106. One or more components (e.g., interface 110, user interface generator 112, layout configurator 114, light fixture selector 116, or model manager 118) of the data processing system 104 can be executed on the manufacturing device 108. In some cases, one or more components or functions of the data processing system 104 can be packaged into a script, agent, or bot configured to execute on the manufacturing device 108 or other devices connected to the network 102.

The interface 110 can interface with the network 102, devices within the system 100 (e.g., client devices 106 or manufacturing devices 108), or components of the data processing system 104. The interface 110 can include features and functionalities to interface with the aforementioned components. For example, the interface 110 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 110 can include at least a built-in network adapter, network interface card, PCMCIA network card, EXPRESSCARD network card, card bus network adapter, wireless network adapter, USB network adapter, modem, or any other device suitable for interfacing one or more devices within the system 100 to any type of network capable of communication. The interface 110 can communicate with one or more aforementioned components to receive data from the client devices 106, such as selections of attributes, coordinates of the digital blueprint of physical space, etc. The interface 110 can communicate with one or more aforementioned components to receive data from the manufacturing device 108, such as updates to the attributes (e.g., compatibility, types, values, etc.), updates on light fixture availability in the inventory, or updates on supporting light fixtures for manufacturing, among others.

The user interface generator 112 can generate, provide, or update GUI for display via at least one of the client device 106 or the manufacturing device 108. The user interface generator 112 can provide the GUI via the application accessible by the client device 106 or the manufacturing device 108. The user interface generator 112 can generate the GUI depending on the authority granted to specific users. For example, a GUI for the administrator having administrator privilege can include interactive elements for adjusting at least the types of attributes for light fixtures or the attribute values (e.g., values of luminescent features, such as a unit of energy per distance ratio, dimensions of light fixtures, CCT value, etc.). The GUI for the administrator can include other information accessible by lower-level users. In another example, the GUI for the lower-level users, such as customers, can include interactive elements for selecting attributes for the lighting system. In response to the user selecting at least one interactive element, the user interface generator 112 may update the visibility or availability of certain other attributes (e.g., types of luminescent features) depending on another attribute being selected (e.g., luminescent type or mounting type). The user interface generator 112 can generate other information for displaying the GUI depending on at least the page of the application (e.g., dashboard, project creation, account, specification panel, etc.), such as shown in conjunction with at least one of FIGS. 2-9, for example.

The user interface generator 112 can generate a digital blueprint of a physical space in which the lighting system is to be installed. The digital blueprint refers to a virtual space or digital canvas in the application that allows the user to specify at least one of the dimensions (e.g., length, width, or height) of the lighting system, types of light fixtures to use, locations of the light fixtures, direction of lighting, shapes of the light fixtures, power feed (e.g., power input or power outlet) location, or emergency light position, among other lighting system configuration.

The user interface generator 112 can generate or update the GUI to display the layout configured by the layout configurator 114 responsive to the user input. The user interface generator 112 can generate or update the GUI to display visual representations of light fixtures selected by the light fixture selector 116 according to the selected attributes. The user interface generator 112 can generate or update other elements of the GUI, such as responsive to user inputs from the client device 106 or updates from the manufacturing device 108, among other authorized devices within the network 102.

The layout configurator 114 can generate, update, or otherwise configure the layout for installation of the lighting system. The layout configurator 114 can generate the layout based on inputs from the client device 106 via the GUI. The layout configurator 114 can update the layout in response to inputs via the GUI. For example, in response to input via the GUI, the layout configurator 114 can detect various coordinates on the digital blueprint for the installation of the lighting system. The coordinates can include latitudinal and longitudinal coordinates on the digital blueprint. The layout configurator 114 determines the sequence of coordinates input by the user. The layout configurator 114 can generate the layout based on the coordinates on the digital blueprint. The layout can include visual representations of the light fixtures extending between various coordinates according to the sequence of coordinates, such as a first set of light fixture(s) from a first coordinate to a second coordinate, a second set of light fixture(s) from the second coordinate to a third coordinate, and so forth. The layout configurator 114 can provide at least a portion of the layout or a portion of the coordinates to the light fixture selector 116 to select the light fixtures. The layout configurator 114 can receive the selected light fixtures from the light fixture selector 116. The layout configurator 114 (or the light fixture selector 116) can send the layout including the light fixtures to the user interface generator 112 for rendering.

The layout configurator 114 can allow at least one layout within the digital blueprint. In some cases, the layout configurator 114 can allow multiple layouts within a single digital blueprint. Each layout can include the light fixtures consecutively connected or positioned next to each other within a specified gap constraint. With multiple layouts, the layout configurator 114 can receive multiple sequences of coordinates input by the user in the digital blueprint.

The layout configurator 114 can detect a portion or a subset of a layout input via the graphical user interface prior to completing the layout for installation. The layout configurator 114 can send the portion of the layout to the light fixture selector 116 for selecting the light fixtures according to the provided portion in response to the detection. In this case, the selected light fixtures can be a subset of various light fixtures to complete the layout. The layout configurator 114 or the light fixture selector 116 can send or provide at least the portion of the light fixtures to the user interface generator 112 for rendering via the GUI before completing the layout for installation.

The layout configurator 114 can identify various attributes for generating the layout. The attributes can be provided or updated according to input via the GUI for the digital blueprint. For example, the attribute can include an emergency lighting type. The layout configurator 114 can receive an indication that the emergency lighting type is selected. The layout configurator 114 can detect coordinates in response to input via the GUI for the emergency lighting type. Subsequently, the layout configurator 114 can generate a layout for emergency lighting type. The layout configurator 114 can request the selection of the emergency light fixture from the light fixture selector 116. The layout configurator 114 can provide the layout of the emergency light to the user interface generator 112 for rendering a visual representation of the emergency light fixtures extending across various coordinates.

The layout configurator 114 can receive input via the GUI rendering the digital blueprint indicating the direction for lighting. For example, the lighting direction may default to face either up or down for a horizontal layout of light fixtures. In another example, the lighting direction may default to face left or right for a vertical layout of light fixtures. The layout configurator 114 can receive input via the GUI selecting at least a portion of the layout and an indication to switch the lighting direction for the portion of the layout. The layout configurator 114 can transmit any layout update to the user interface generator 112 for updating the GUI or rendering of the lighting fixtures.

The layout configurator 114 can insert or add a power feed at the first coordinate input by the user. The layout configurator 114 can detect inputs via the GUI to update the power feed location or add at least one additional power feed along a portion of the layout. The layout configurator 114 can update the power feed location or include at least one additional power feed based on the input.

In some cases, the layout configurator 114 can use at least one model managed by the model manager 118 to determine whether various constraints are satisfied in the layout. For example, the layout configurator 114 can use a model to determine whether the light fixtures selected by the light fixture selector 116 satisfy a power constraint. To satisfy the power constraint, the total rated power consumption by the selected light fixtures can be at or below a power threshold. The power threshold can correspond to the maximum power output via the power feed or the power outlet. If the light fixtures exceed or do not satisfy the power constraint, the layout configurator 114 can dynamically add at least one additional power feed (e.g., a second power feed) to a portion of the layout, such that the one or more light fixtures that exceed the power constraint can be supplied with power via the second power feed.

The layout configurator 114 can use the model to configure the layout to satisfy other constraints, such as a gap constraint. The gap constraint can refer to the maximum allowable non-illuminated distance between light fixtures for a given run of light fixtures. The gap constraint can be predefined as 0.5 inches, 0.4 inches, 0.3 inches, etc. The selection of the light fixtures and positioning of the selected light fixtures in the layout can adhere to the gap constraint using the model. Exceeding the gap constraint can result in visually noticeable gaps or separations between illuminated light fixtures. The light fixture selector 116 or other components of the data processing system 104 can use the model to perform their respective features or operations to satisfy the various constraints.

For example, the layout configurator 114 can provide the layout to the light fixture selector 116 for selecting, using the model, the light fixtures with respective types or lengths that satisfy the layout and the gap constraint. The layout configurator 114 can receive the selected light fixtures from the light fixture selector 116. The layout configurator 114 can position the selected light fixtures according to the layout and gap constraint. The layout configurator 114 can provide the layout with the light fixtures to the user interface generator 112 for rendering the light fixtures in the layout via the GUI.

The light fixture selector 116 can select the light fixtures according to the attributes selected by the user and the layout. The light fixture selector 116 can detect the layout for installation of the lighting system in response to input via the GUI from the user. The light fixture selector 116 can detect the layout generated by the layout configurator 114 according to coordinates received from the client device 106. The light fixture selector 116 can use the model to select one or more light fixtures to satisfy the gap constraint. The light fixture selector 116 can select the light fixtures based on the layout and the attributes that, when electrically coupled to conform to the layout, satisfy the gap constraint. The attribute can include at least one of a luminescent type, a mounting type, or a luminescent feature. The luminescent type may include at least one of product type, technology type, or other information related to the technology of the light fixture. The mounting type can include at least one of floor mount, wall mount, ceiling mount, low profile mount, adjustable clip, fixed clip, or other types of mounting platform. The luminescent feature can include at least one of luminaire output, power, voltage, CCT, CRI, beam, finish (e.g., color of light fixture), or lighting control, among other features.

The light fixture selector 116 can select the light fixtures including a first light fixture and a second light fixture having a different configuration than the first light fixture. The different configuration can include at least one of a length or a shape. The available length or shape of light fixtures may be different depending on the selected attributes. For example, certain product types may include angled light fixtures and some other product types may not include angled light fixtures. Further, certain types of product or technologies may include a first set of available (e.g., predefined) lengths and other types of product or technologies may include a second set of available lengths, which may or may not include predefined lengths from the first set. For instance, the length can include at least one of 4 inches, 6 inches, 8 inches, 12 inches, 18 inches, 48 inches, etc.

The light fixture selector 116 can use the model to select one or more lengths for the light fixtures to conform with the criteria including the layout and gap constraint. For example, the model may perform simulations of different lengths of light fixtures that conform with the criteria. Take a straight run layout (e.g., lighting system extending from a first coordinate to a second coordinate), for example, the model can select the light fixture(s) with the longest length that is within the layout boundary (e.g., between the first and second coordinates). The model can determine whether these selected light fixture(s) satisfy the criteria by simulating arrangements or positioning of the light fixtures. If at least one arrangement of the selected light fixtures satisfies the criteria, the light fixture selector 116 can use the selected light fixtures for the layout. Otherwise, the light fixture selector 116 can reiterate the process by selecting light fixture(s) having the next longest length that fits the remainder of the layout. After iterating through the available lengths of light fixtures, if the gap constraint is still not satisfied, the light fixture selector 116 can substitute at least one previously selected light fixture with multiple shorter light fixtures, such as replacing the longest light fixture with two relatively shorter light fixtures. For instance, the light fixture selector 116 may replace a 16-inch light fixture with two 8-inch light fixtures, thereby allowing an additional gap between the two 8-inch light fixtures. In further example, the 16-inch light fixture may be replaced with a 4-inch light fixture and two 6-inch light fixtures, allowing two additional gaps between these light fixtures. The total length of the substituted light fixtures may be greater than, less than, or equal to the length of the previous light fixture to satisfy the gap constraint.

The light fixture selector 116 can detect the layout generated by the layout configurator 114 including a first dimension and a second dimension that is perpendicular to, or otherwise angled from, the first dimension. In this case, depending on the selected attribute(s), the light fixture selector 116 can select light fixtures including a first light fixture, a second light fixture, and a third light fixture, for example. The first light fixture can be with a first run size and a straight run. The second light fixture can be with a second run size and an L-shape. The third light fixture can be with a third size and the straight run. The first light fixture can be electrically coupled to the third light fixture via the second light fixture, such that the second light fixture is interposed between the first and third light fixtures. The first light fixture can be perpendicular to the third light fixture. The angle of the second light fixture may be adjustable depending on the selected attributes. For instance, a certain type of product or technology may include light fixtures with 90 degrees angle, while certain other types of product or technology may include light fixtures with an adjustable angle of up to 180 degrees. Different lengths of the angled light fixture may be available depending on the attributes.

The light fixture selector 116 can identify the direction of light according to the layout generated by the layout configurator 114. The light fixture selector 116 can select the light fixtures to conform with the layout based on the lighting direction. In some cases, the selected light fixture may be bidirectional, such that the user can change the direction of the light fixture during the installation of the lighting system.

The light fixture selector 116 can identify the number of power feed for the layout. The light fixture selector 116 can select the light fixtures based on the number of power feeds. For instance, the light fixture selector 116 can select a number light fixtures configured to connect with the power feed, where the number of these light fixtures corresponds to the number of power feeds. Further, the light fixture selector 116 can select a number of light fixtures with a voided end configured to sit on or cover the power feed (e.g., power input cable connecting to the next light fixture). For example, with two power feeds, the light fixture selector 116 can select at least one light fixture with the voided end. In another example, with three power feeds, the light fixture selector 116 can select at least two light fixtures with the voided end. Having the voided end of the light fixture to cover the exposed power cable can minimize the gap between the light fixtures, satisfying the gap constraint.

In some cases, the light fixture selector 116 can detect that the attribute including an emergency lighting type is selected. Based on the coordinates input via the GUI, the light fixture selector 116 can determine the distance for the emergency light run. The light fixture selector 116 can select one or more emergency light fixtures (e.g., lighting units connected to a battery) to conform with the layout.

Thus, in some cases, the data processing system can perform automated drawing creation from existing PDF or CAD files. To do so, the data processing system can receive, from a user upload, a drawing and a selection of a line on the drawing that is intended by the architect to depict a lighting type. The data processing system can then identify and converting that bitmap or vector into dimensions and subsequent light fixtures.

The model manager 118 can manage models configured to manage compatibilities between different attributes, configure the layout, or select light fixtures to satisfy the constraints, among others. The model can be configured to configure the layout or select the light fixture to satisfy at least one of the selected attributes, gap constraint, power constraint, or other constraints specified by the user or the administrator. The model manager 118 can generate, update, or replace one or more models based on the information from the manufacturing device 108.

For example, the model manager 118 can receive or obtain the predefined specification from the manufacturing device 108 or the data repository 120. Using the model, the model manager 118 can identify the attributes of the lighting system available from the entity (e.g., manufacturer or distributor) according to the predefined specification. The attributes can include at least one of a luminescent type, a mounting type, or a luminescent feature. Based on the predefined specification, the model manager 118 can use the model to identify mounting types compatible with each luminescent type. Further, the model can identify the luminescent features compatible with each mounting type or each luminescent type. The model manager 118 can iterate the process for each attribute in the predefined specification to determine compatibilities between all attributes. The model manager 118 may receive an updated predefined specification. Accordingly, the model manager 118 can update compatibilities between the attributes as necessary using the model.

The model manager 118 can select a model from the list of models based on at least one of the attributes selected by the user. For instance, the model manager 118 can select a first model configured to identify attributes compatible or supported with a first selected luminescent type or a second model configured to identify attributes compatible with a second selected luminescent type, etc. Based on the compatibility of the luminescent type, the model can filter attributes that are not compatible or indicate attributes that are compatible.

The model manager 118 can select a model based on at least one of the mounting type or the luminescent feature. For example, the model manager 118 can select a first model configured to identify luminescent features or luminescent types compatible with a first selected mounting type, a second model configured to identify luminescent features or luminescent types compatible with a second selected mounting type, and so forth. In another example, the model manager 118 can select a first model configured to identify mounting types or luminescent types compatible with a first selected set of luminescent feature(s), a second model configured to identify mounting types or luminescent types compatible with a second selected set of luminescent feature(s), and so forth. In some cases, the selected model can be configured to identify compatible or non-compatible attributes associated with a combination of the select mounting type and luminescent feature, among other combinations of attributes.

In some other cases, the model manager 118 can select the model configured to satisfy a unit of energy per distance ratio (e.g., power constraint). The unit of energy per distance ratio can refer to the wattage per foot of light fixtures having the same configuration. In this case, the model is configured to detect or identify the attributes selected by the user to determine a set of light fixtures for selection to satisfy the selected attributes (e.g., configuration). The selected attributes of the light fixtures can reflect the unit of energy per distance ratio for the light fixtures, such as selected CCT, CRI, or lumen output, among others. The model can determine the total power consumption for the run of light fixtures based on the distance or size of the run and the unit of energy per distance. The model can determine the total available power output via the power feed indicated by the layout configurator 114. The model can compare the total power consumption and the available power output to determine whether the light fixtures exceed the power constraint. In response to exceeding the power constraint, the model can trigger the layout configurator 114 to input at least one additional power feed or trigger the light fixture selector 116 to select at least one light fixture configured to connect to the power feed or a type of light fixture positioned at the end of the run (e.g., with voided end).

The model manager 118 can provided the selected model to one or more other components of the data processing system 104, such as the layout configurator 114 or the light fixture selector 116. The components of the data processing system 104 can use the model to perform their respective functions. For example, the user interface generator 112 can use the model to present, highlight, or filter one or more attributes, such as luminescent types, mounting types, or luminescent features depending on compatibility, availability, or support. The layout configurator 114 can use the model to generate at least a portion of the layout satisfying the various constraints, such as gap constraint, power constraint, or other constraints defined by the administrator or the user. Further, the light fixture selector 116 can use the model to select one or more light fixtures according to the selected attributes (e.g., luminescent type, luminescent feature, mounting type, or emergency lighting type), available lengths, gap constraint, power constraint, conformity to the layout, etc.

In some cases, the model can be used by the light fixture selector 116 for optimizing cost. For instance, one of the selected light fixtures conforming to the layout and gap constraint may include a 16-inch light fixture. If the total cost of two 8-inch light fixtures is cheaper than the 16-inch light fixture, the model can trigger the light fixture selector 116 to replace the 16-inch light fixture with two 8-inch light fixtures instead, depending on lengths available. In certain cases, each of the models can include or correspond to a respective set of scripts or codes configured to perform the features or functionalities described herein.

After finalizing the layout and selecting the light fixtures to conform with the layout, the data processing system 104 can provide or transmit an instruction to the manufacturing device 108 to cause the manufacturing of the selected light fixtures in accordance with the layout and the selected attributes. Causing the manufacturing of the selected light fixtures can refer to notifying, via the manufacturing device 108, the entity (e.g., manufacturer or distributor) of a new request for light fixtures. According to the request, the entity can activate manufacturing equipment for manufacturing the light fixtures. In some cases, according to the request, the entity can distribute (e.g., pack and ship) the light fixtures to the requester based on the availability of light fixtures in the inventory. In some cases, the manufacturing device 108 may correspond to the manufacturing equipment configured to receive instructions from the data processing system 104. Accordingly, in response to receiving the instructions, the manufacturing device 108 can initiate a manufacturing process for the requested light fixtures.

The data repository 120 can include the user interface storage 122. The user interface storage 122 can include, store, or maintain preconfigured user interface (e.g., GUI) for rendering to the client device 106 or the manufacturing device 108 via an application accessible to authorized users. The GUI can include various pages, such as a dashboard, project creation page, project panel including various created project, specification panel including various attributes for selection in a particular project, drawing panel for presenting the digital blueprint or layout, order panel for presenting historical projects ordered by the user, among other pages configurable by the administrator. The GUI can include interactive elements in individual pages, panels, widgets, or tabs in the application. The user can interact with the interactive elements, for example, to navigate between pages, create a project, select attributes for the lighting system, input information, input coordinates in the digital blueprint, or other predefined actions. The GUI can include any other features or information configurable by the administrator, including but not limited to images, texts, pop-up elements, etc. The user interface storage 122 can be accessible by various devices within the network 102 via the application.

The data repository 120 can include the attribute storage 124. The attribute storage 124 can include, store, or maintain attributes available for the lighting system. The attribute storage 124 can be accessible by the devices within the network 102, such as the client device 106 or the manufacturing device 108 via the application. The attribute storage 124 can store attributes received from the manufacturing device 108. The attributes can be updated by the administrator.

The data repository 120 can include the layout storage 126. The layout storage 126 can include, store, or maintain layouts generated by the client device 106. For example, in response to finalizing the layout, the user can interact with the GUI to save the configured layout. The layout storage 126 can maintain the layouts generated by the user until the user request to delete certain layouts. In some cases, the layout storage 126 can maintain the layouts until the time associated with each layout expires. The layout storage 126 can be accessed by the client device 106 or the manufacturing device 108 to add, update, or remove the layout(s).

The data repository 120 can include the light fixture storage 128. The light fixture storage 128 can include, store, or maintain various types of light fixtures available by the entity. Available light fixtures can refer to light fixtures currently stored in a physical inventory of the manufacturer or distributor. In some cases, available light fixtures can refer to light fixtures supported by the manufacturer for manufacturing purposes. The light fixture storage 128 can be accessed by the client device 106 for light fixture selection. The light fixture storage 128 can be accessed by the manufacturing device 108 to update the available light fixtures for selection by the light fixture selector 116.

The data repository 120 can include the constraint storage 130. The constraint storage 130 can include, store, or maintain constraints defined by the administrator or the user. The constraints can include at least one of gap constraint, power constraint, etc. In some cases, the layout configured by the user or selected attributes may be considered part of the constraint. The constraint storage 130 can be accessed by the client device 106 or the manufacturing device 108 via the application for updating, adding, or removing certain constraint(s).

The data repository 120 can include the model storage 132. The model storage 132 can include, store, or maintain the models selectable by the model manager 118. The model may be generated by the model manager 118 or the manufacturing device 108. The model can be updated in response to receiving updated information from the manufacturing device 108. The model storage 132 can be accessed by the manufacturing device 108, or other devices within the network 102 for adding, updating, or removing one or more models.

The various storages in the data repository 120 can be accessed by other components of the data processing system 104. For example, the user interface generator 112 can access the user interface storage 122 to retrieve or obtain GUI for rendering. The layout configurator 114 can access the layout storage 126 to store, modify, remove, or otherwise manage the layouts in the layout storage 126. The light fixture selector 116 can access the light fixture storage 128 to select at least one of the light fixtures from the light fixture storage 128 satisfying various criteria, such as attributes, gap constraints, etc. The model manager 118 can access the model storage 132 to obtain or select the model. Other examples can be applied, such that the components of the data processing system 104 can access any of the storages in the data repository 120.

Referring generally to FIGS. 2-9, example GUIs 200-900 to select the light fixtures for a lighting system are shown. The GUIs 200-900 of FIGS. 2-9 can be rendered by the user interface generator 112 on the application executable for the client device 106, the manufacturing device 108, or other devices within the network 102. In some cases, the application can correspond to software or program executed by the data processing system 104, the client device 106, or the manufacturing device 108. For instance, the client device 106 can execute the application to communicate with the data processing system 104 (e.g., user interface generator 112) to receive data for rendering at least one of the GUIs 200-900. In this case, the GUIs 200-900 or elements of the GUIs 200-900 can be pre-configured (e.g., by the administrator or developer of the application) and stored in the user interface storage 122. The elements (e.g., interactive elements, images, texts, objects, click boxes, or other visual representations) of the GUIs 200-900 can be positioned, arranged, or organized by the administrator. The interactive elements can include at least one of buttons, sliders, drop-down menu, etc.

The example GUIs 200-900 of FIGS. 2-9 may include more or fewer details as configured by the administrator. The GUIs 200-900 can represent a certain page or a process for selecting the light fixtures for the lighting system to be requested from the manufacturing device 108. FIGS. 2-9 can include operations, procedures, or processes executed, performed, or otherwise carried out by one or more components of the system 100 (e.g., data processing system 104, client device 106, manufacturing device 108, or other devices within the network 102).

Referring now to FIG. 2, in greater detail, the GUI 200 can represent a project creation page for the application. As shown, the GUI 200 for the project creation page can include various input sections for entering information related to the project for installation of the lighting system. The input sections can include user information (e.g., name, address, payment information, etc.), project information (e.g., project name, schedule, etc.), notes for the entity, or other required or optional inputs requested of the user. The GUI 200 can include interactive elements including, but not limited to, at least one of interactive elements 202, 204, or 206. The interactive elements 202, 204, or 206 can include or be associated with a hyperlink or a script, where in response to an interaction with the interactive elements 202, 204, or 206, the data processing system 104 (e.g., user interface generator 112) is configured to redirect the user to a particular page.

For example, the data processing system 104 can redirect, via interaction with the interactive element 202, the application executing on the client device 106 to a specification page for generating a personalized specification for the lighting system without information irrelevant to the lighting system of the project. Each generated project can include a lighting system configured by the user. The data processing system 104 can redirect, via interaction with the interactive element 204, the application to a quote page for generating a quote for the lighting system (e.g., cost for individual light fixtures) associated with the specification. The data processing system 104 can redirect, via interaction with the interactive element 206, the application to a drawing page for managing layouts for installation of the lighting system associated with the specification or the quote.

By creating a project, the data processing system 104 can provide digitized specification(s) tailored to the specific lighting system configured by the user. The configuration (e.g., selected attributes) of the lighting system may be shared across the specification, quote, and drawings of the project. The specification, quote, and drawings can refer to types of documents within the project. These documents (e.g., specification, quote, or drawing) may share data regarding the configuration of the lighting system with each other. Hence, the updated configuration of the lighting system can be centralized across other documents within the project. The data processing system 104 can store the created project in the data repository 120. In some cases, the created project may be saved on the respective device executing the application, such as the client device 106 or the manufacturing device 108, among others.

Figure 3:
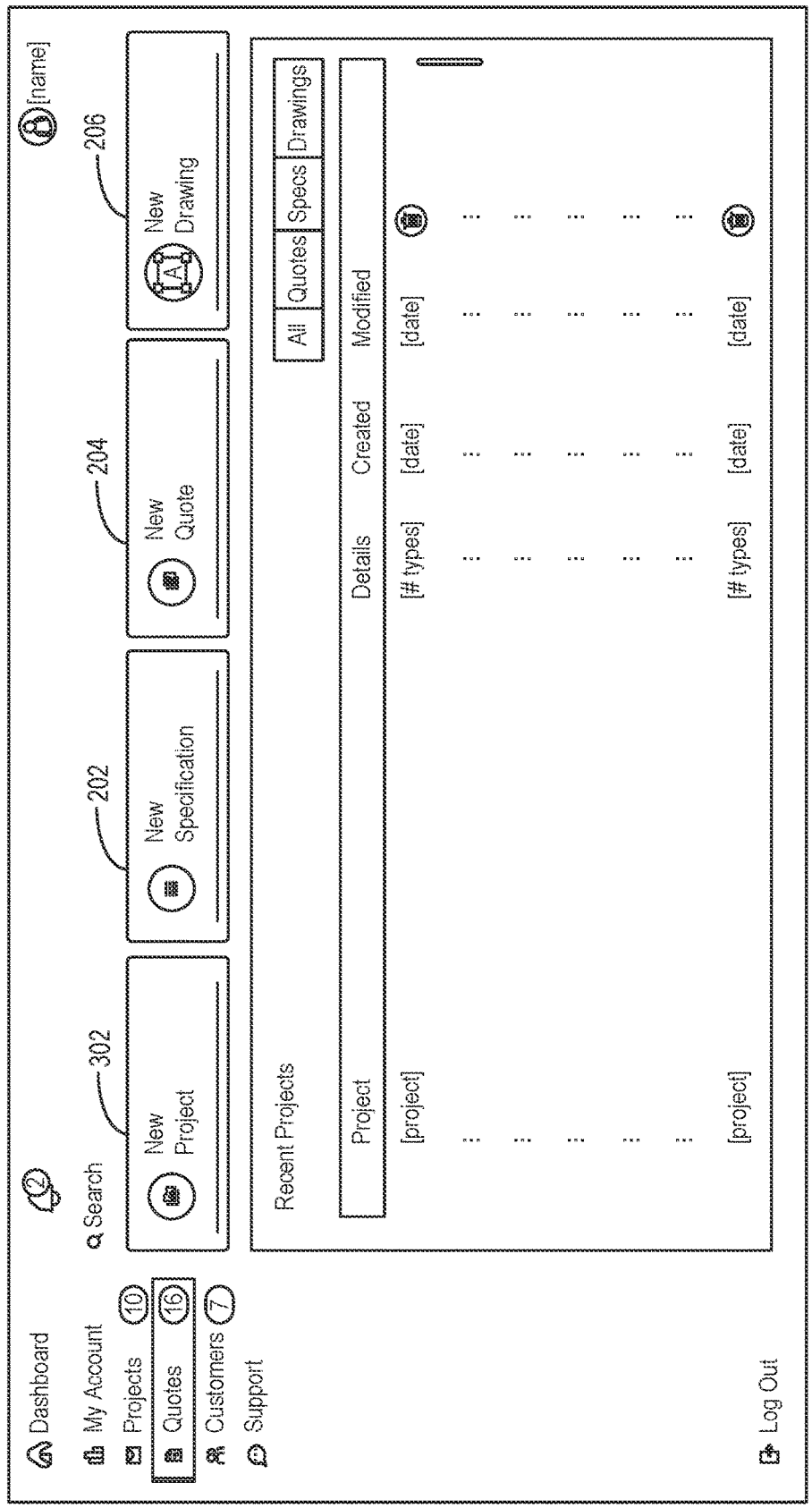

Referring to FIG. 3, the GUI 300 can represent a dashboard page (e.g., summary page or overview page) of the application. The GUI 300 can include an overview of a particular document generated by the data processing system 104. In this case, the GUI 300 can show an example overview of the quote document including one or more projects and details (e.g., notes, costs, type of product, creation time, last modified time, etc.) associated with the projects. The example overview of the quote document can include interactive elements for deleting respective projects. The listing of projects can be interactive elements, where in response to an interaction, the data processing system 104 (e.g., user interface generator 112) can redirect the application to the corresponding page for editing one of the projects. The GUI 300 can include the interactive elements 202, 204, and 206 similarly to GUI 200. The GUI 300 can include interactive element 302. In response to an interaction with the interactive element 302, the data processing system 104 can redirect the application to the project creation page, such as GUI 200 in conjunction with FIG. 2. Additionally or alternatively, the GUI 300 (or other GUIs 200-900) can include buttons, tabs, or interactive elements for navigating to different pages within the application.

Figure 4:
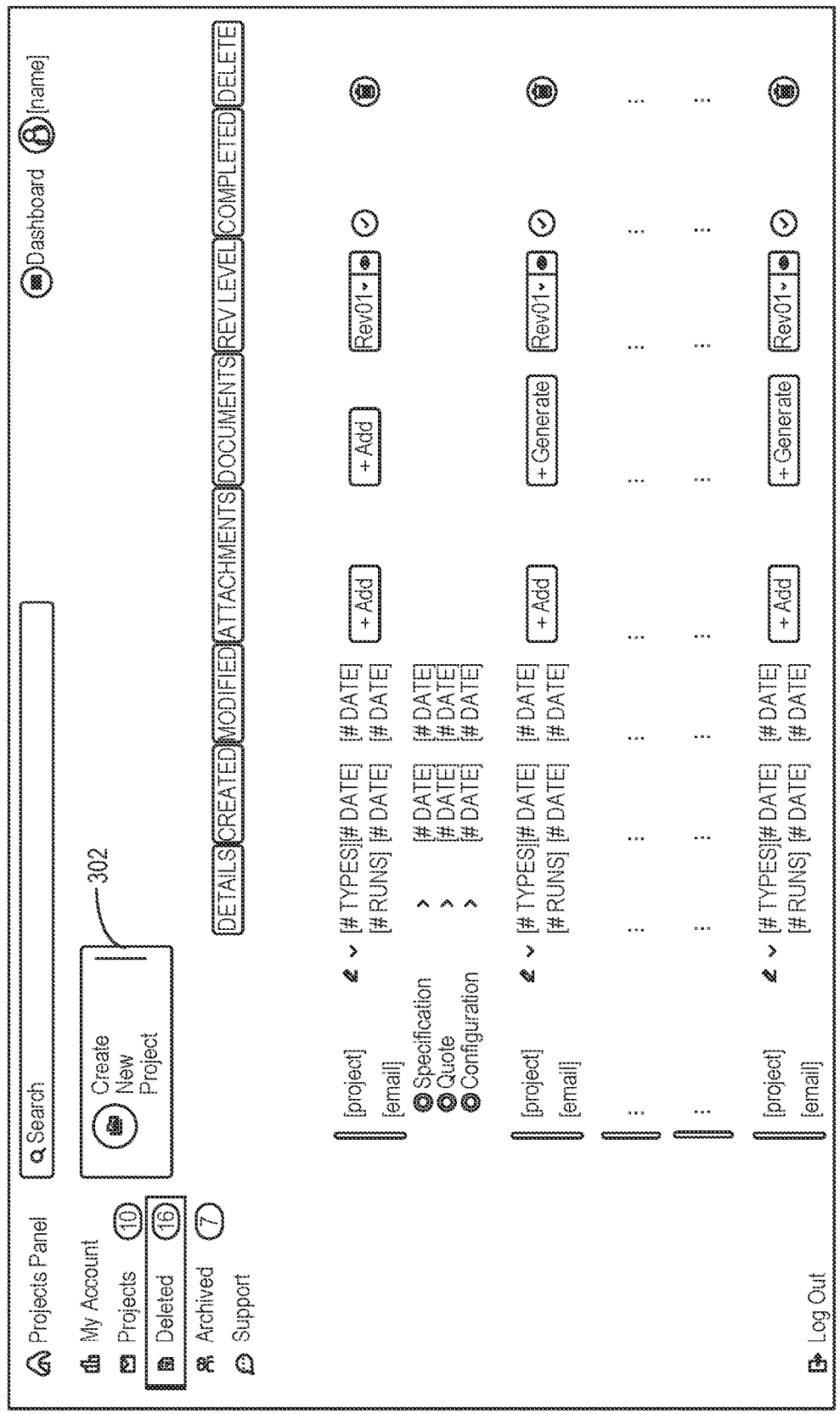

Referring to FIG. 4, the GUI 400 can represent a deleted project page. The GUI 400 can include a list of historical projects created by the user (e.g., account owner or authorized personnel) that are deleted. As shown, the GUI 400 can show a similar overview of the projects as the GUI 300, described in conjunction with FIG. 3, for example. At this point, the listing of projects in the deleted project page can be recovered in response to a recovery request. The GUI 400 can include an interactive element associated with each project to permanently remove or delete the respective project, such as deleting the project from the data repository 120. The permanently deleted project may not be recoverable.

Figure 5:
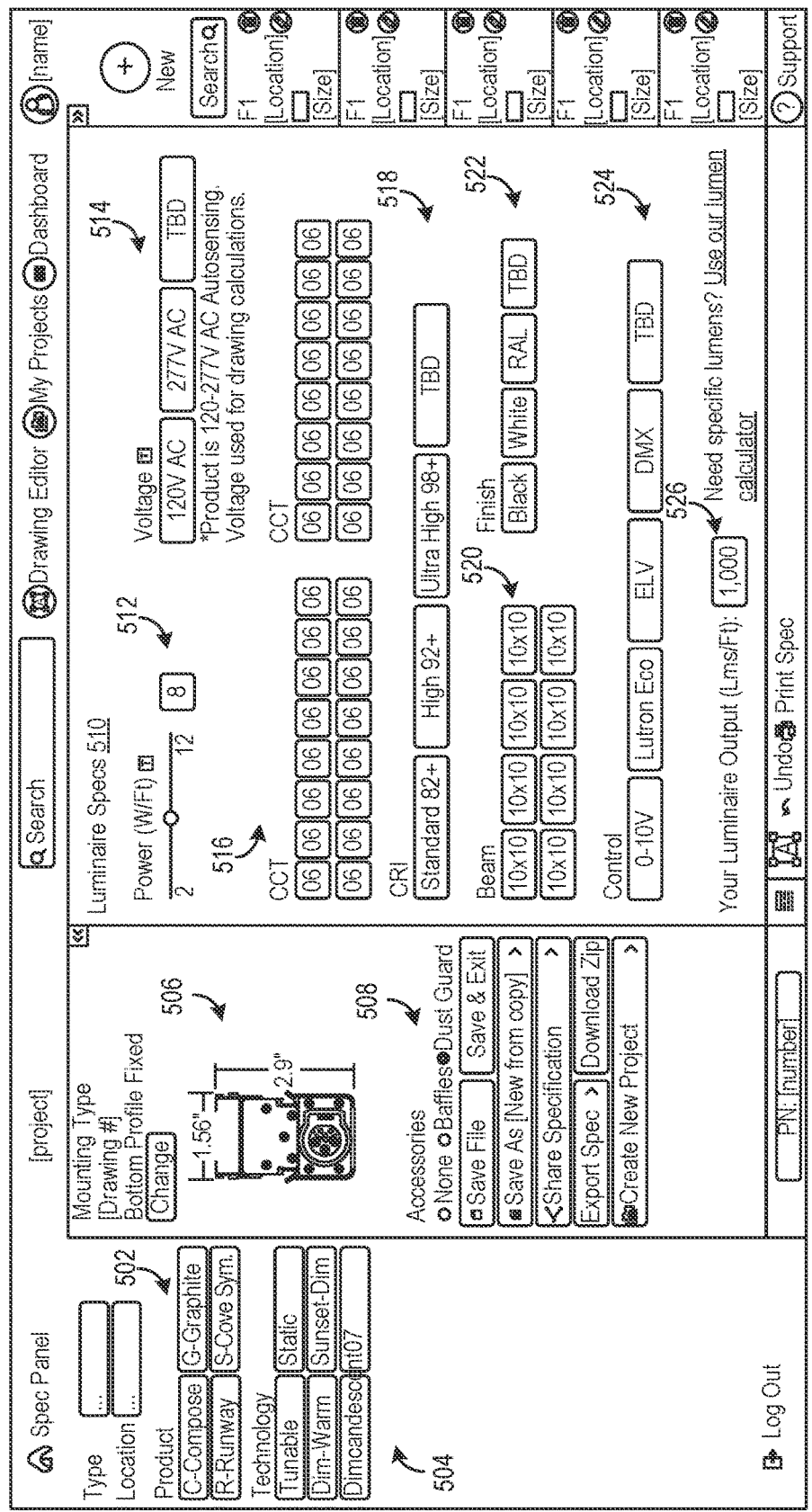

Referring to FIG. 5, the GUI 500 can represent a specification page to create a specification for the lighting system under a certain project. The GUI 500 can include various attributes selectable by the user via the GUI 500. The attributes can be associated with interactive elements, such that the respective attributes can be selected in response to interaction with the interactive element (e.g., the data processing system 104 receiving an indication of interaction at a particular coordinate of the GUI 500). The attributes can include at least luminescent types, mounting types, or luminescent features (e.g., sometimes referred to as features).

For example, the luminescent types can include products 502 offered by the entity and the technology 504 related to the light fixtures. The product 502 can include at least one of compose light fixtures, graphite light fixtures, runway light fixtures, cove symmetric light fixtures, or other lighting designs. The product(s) 502 can be added, removed, or otherwise managed by the entity or administrator. Each type of the product 502 can be different from each other, although multiple types of products 502 can be used in the same project. The available products 502 presented to the user may be different depending on other selected attributes, such as selected luminescent features, mounting type, or technology 504, for example.

The technology 504 can include at least one of tunable lighting, static lighting, dim-warm lighting, sunset-dim lighting, or dim-candescent lighting, among other types of lighting. The technology 504 presented to the user may be managed by the entity. The types of technology 504 available can depend on the selected product 502. The data processing system 104 (e.g., user interface generator 112) can gray out, hide, or not display attributes (e.g., product 502, technology 504, etc.) that are unavailable for selection. The selection of the technology 504 can affect the availability of certain luminescent features, mounting types, or product 502, for example.

The GUI 500 can include an image 506 (e.g., overview) of the selected mounting type (if selected). Otherwise, the image 506 may include an example mounting type, a message indicating to select a mounting type, or an empty space, among others depending on the configuration of the GUI 500. The selection of the mounting type can be performed via interaction with the GUI 600, as described in conjunction with FIG. 6. The image 506 can be an interactive element configured to redirect the application to display GUI 600 for selecting or changing the mounting type, for example. The mounting type can include at least one of gypsum flat front (GFF), GFF wipe down, gypsum knife edge at a certain angle, wall mount, wall wash, axiom grazer, universal mount, or other types of mount for mounting the light fixtures. The selection of mounting types can be configurable or indicated by the entity. The GUI 600 can include selectable accessories 508 options, such as baffles or dust guards configured for the lighting system. The selection of the mounting type (or the luminescent type) can affect the availability of certain luminescent features.

The GUI 500 can include selectable luminescent features in the luminaire specification section 510. The luminescent features can include at least one of power consumption 512, voltage 514, CCT 516, CRI 518, beam 520, finish 522, control 524, luminaire output 526, or other features configurable for the lighting system. The power consumption 512 can represent an adjustable unit of energy per distance ratio (e.g., watts per foot) for the lighting system. In this case, the voltage 514 can represent the power output for powering the lighting system, which can be used for calculating the maximum run size given the power consumption 512. The CCT 516 can represent the color temperature in kelvin (K), such as 2700K, 3000K, 3500K, 4000K, 5000K, etc. The CRI 518 can represent a quantitative measurement for rendering natural colors under an artificial white light source compared to sunlight from 0 (e.g., colors look the same) to 100 (e.g., reflects true color of the object). For example, the CRI 518 for the light fixtures can include at least one of a measurement of 82, 92, 98, etc. The beam 520 can represent the size of the light fixtures. The finish 522 can represent the color for the light fixtures. The control 524 can represent the type of software or hardware used to control the operation of the light fixtures (e.g., on/off, dim, color switching, etc.).

The luminaire output 526 can include an interactive element for the user to enter a desired lumen per distance (e.g., foot) for the light fixtures. Depending on the lumen provided by the user, the data processing system 104 (e.g., light fixture selector 116) can compute the corresponding power consumption 512 based on the selected CCT 516 and CRI 518. For example, for purposes of the computation, individual CCTs can correspond to predefined multipliers. The higher the multiplier, the higher the power consumption 512. An example of the multiplier corresponding to some CCTs can be shown in Table 1.

TABLE 1

LUMEN FACTOR
Output Factors

| CCT | Multiplier |
| --- | --- |
| 1850K | 0.70 |
| 2000K | 0.70 |
| 2200K | 0.81 |
| 2500K | 0.86 |
| 2700K | 0.96 |
| 3000K | 1.00 |
| 3500K | 1.05 |
| 4000K | 1.05 |
| 4500K | 1.05 |
| 5000K | 1.05 |
| 5700K | 1.05 |
| 6500K | 1.05 |

Further, based on the selected CRI in addition to the selected CCT, the data processing system 104 can perform a lookup in a predefined table (e.g., Table 2) to determine the equivalent power consumption 512 necessary to obtain the desired luminaire output 526. Selecting a relatively higher CRI can incur higher power consumption, as shown in Table 2. The tables can be predefined by the entity. The data processing system 104 can update the table in response to receiving update data from the manufacturing device 108, for example. Although Table 2 illustrates the lumen data for a 3000K CCT with 92 CRI and 98 CRI, additional metrics or tables can be predefined for other CCTs or CRIs, and used in a similar manner to determine the corresponding power consumption given the desired luminaire output.

3000K LUMEN DATA

| System | Delivered Lumens/Ft | |
|---|---|---|
| Watts/Ft | 92+ CRI | 98+ CRI |
| 2 | 135 | 119 |
| 3 | 228 | 200 |
| 4 | 286 | 253 |
| 5 | 401 | 354 |
| 6 | 504 | 445 |
| 7 | 606 | 534 |
| 8 | 733 | 645 |
| 9 | 970 | 849 |
| 10 | 1078 | 945 |
| 11 | 1174 | 1030 |
| 12 | 1277 | 1125 |

After determining the equivalent unit of energy per distance ratio (e.g., wattage per foot), the data processing system 104 (e.g., layout configurator 114) can determine the maximum size, length, or distance of a run (e.g., the distance of the light fixtures connected to the power feed). The data processing system 104 can use a predefined metric or table (e.g., Table 3) to determine the maximum run length based on the ratio and the voltage 514. A relatively higher ratio can correspond to a relatively shorter maximum run length. A relatively lower ratio can correspond to a relatively longer maximum run length. Further, a relatively higher voltage 514 can provide a relatively longer maximum run length, and vice versa. In some cases, the maximum run length provided by Table 3 may represent the recommended maximum run length, as certain users may not operate the light fixtures (e.g., dimmable light fixtures) at the maximum supported luminaire output, for example.

TABLE 3

MAX RUN PER POWER FEED

| Watts | Maximum Run Length (Ft) | |
|---|---|---|
| Power | 120VAC | 277VAC |
| 2 | 144 | 144 |
| 3 | 120 | 124 |
| 4 | 108 | 120 |
| 5 | 92 | 108 |
| 6 | 80 | 100 |
| 7 | 72 | 96 |
| 8 | 64 | 88 |
| 9 | 56 | 84 |
| 10 | 52 | 80 |
| 11 | 48 | 78 |
| 12 | 44 | 76 |

The availability of the luminaire features of section 510 can be affected by the selection of other attributes. For instance, the data processing system 104 (e.g., user interface generator 112) can update the GUI 500 to change the availability of some luminaire features in response to selection or changes to the product 502, technology 504, mounting type, or certain other luminaire features. After the update, the data processing system 104 can render the GUI 500 that displays luminaire features of the lighting system that are compatible with other features and attributes. Hence, the data processing system 104 can eliminate errors in users selecting unavailable or non-compatible attributes. Further, depending on the selected attributes, the data processing system 104 can determine the available lengths corresponding to the attributes of the lighting system. The available lengths can be predefined by the entity and stored in the data repository 120, each combination of attributes may be associated with a set of available lengths.

The data processing system 104 can aggregate the selected attributes and store the selected attributes in the data repository 120 as a part of a configuration for the lighting system of the project. The data processing system 104 can save any updates to the configuration in real-time, periodically (e.g., every 10 seconds, 30 seconds, etc.), or upon interaction with a save button. The data processing system 104 can share or copy the configuration from the specification to other parts of the project, such as the quote or the drawings. Sharing the configuration can be performed automatically or in response to receiving a request from the user to share the configuration with other parts of the project. In this case, a similar configuration for the light fixtures can be reflected in at least the quote page or the drawing page.

Figure 6:
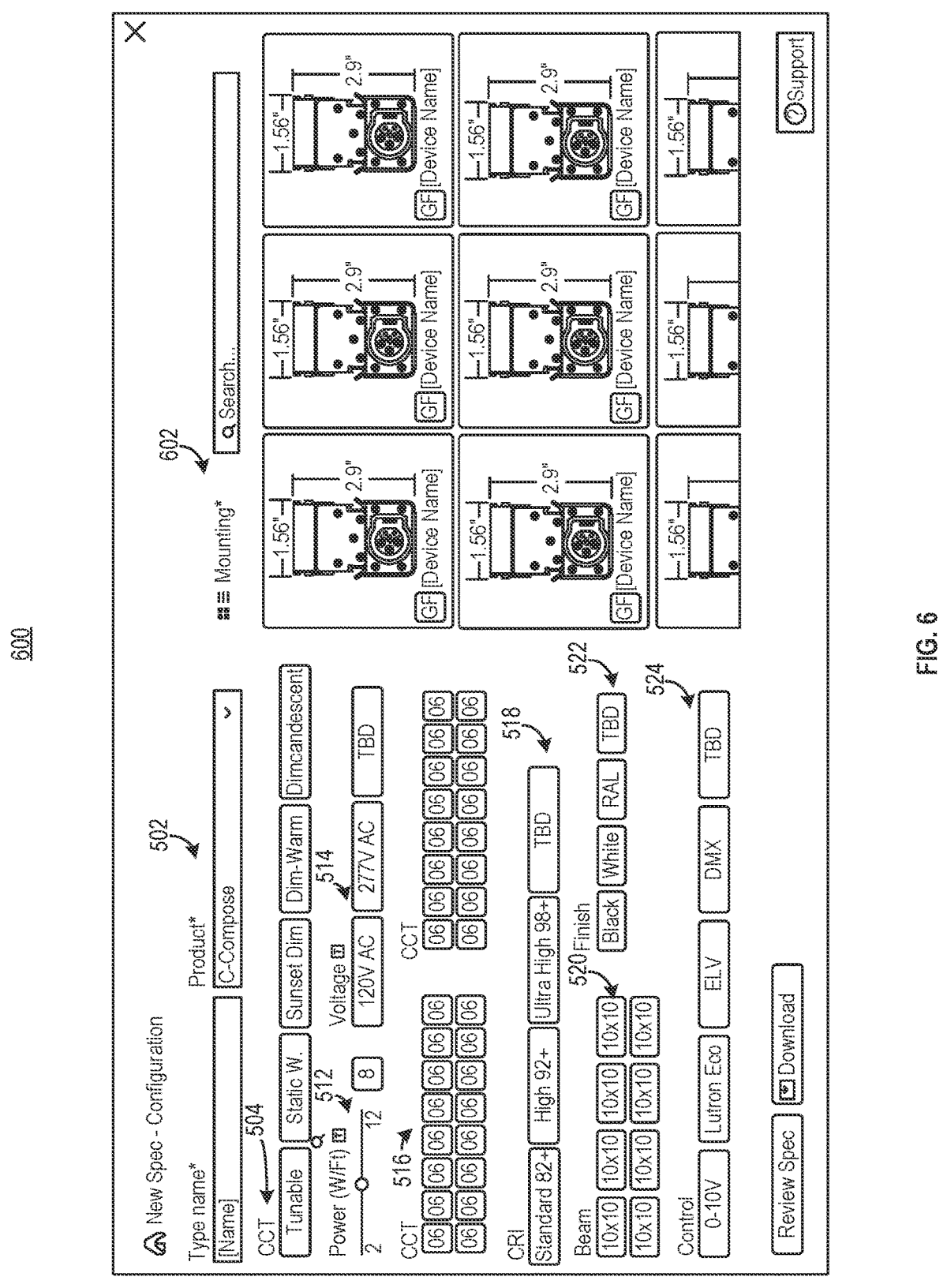

Referring to FIG. 6, the GUI 600 can represent the specification creation page of GUI 500 with an expanded view for mounting type selection. The GUI 600 can include various elements or attributes presented in GUI 500, such as the luminescent type, luminescent features, etc. The GUI 600 can include section 602 for selecting a mounting type. The section 602 can include images, texts, identification numbers, or other depictions of the various mounting types available for manufacturing or distribution by the entity. The GUI 600 can show available mounting types based on the selection of one or more other attributes, such as the luminescent type or luminescent features. Each depiction of the mounting type can correspond to an interactive element, where interaction with the interactive element can trigger a pop-up with additional information regarding the mounting type (e.g., hovering over the mounting type) or indicate a selection of the mounting type (e.g., mouse click or gesture on a touchscreen, etc.).

Figure 7:
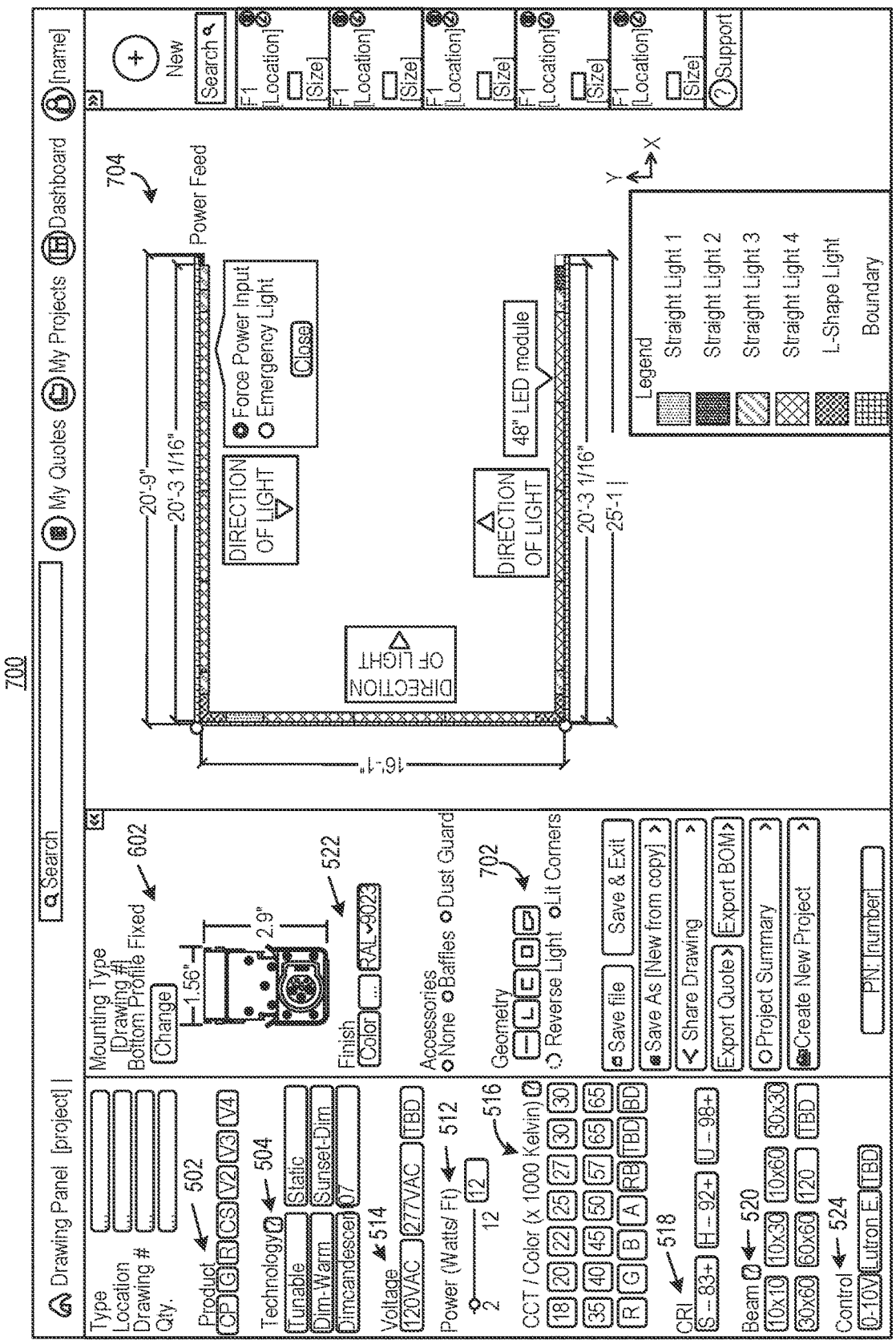

Referring to FIG. 7, the GUI 700 can represent the drawing page with a digital blueprint for configuring a layout for the installation of the lighting system. In some cases, prior to presenting GUI 700, the data processing system 104 can prompt the user regarding whether to use at least one of the existing specifications (e.g., selected attributes) for the lighting system or select new attributes for the lighting system. In the case of using existing/saved attributes, the data processing system 104 can convert the selected attributes into the drawing in the digital blueprint.

The GUI 700 can include selectable geometry 702 for the lighting system. Selecting the geometry 702 can allow the data processing system 104 (e.g., layout configurator 114) to determine the style or design of the layout to generate in the drawing section 704. The geometry 702 can include at least a straight run design, L-shape design, U-shape design, rectangular design, or custom design.

The GUI 700 can include a drawing section 704 to provide the digital blueprint to the user. The drawing section 704 can illustratively present a physical space in which the lighting system is to be installed. When the user first navigates to the drawing page, the drawing section 704 can be empty or clear of any drawings (e.g., may include grids as a drawing guideline). As shown in GUI 700, the data processing system 104 can receive a selected geometry 702 and coordinates input by the user via the GUI 700. In response to detecting the coordinates, the data processing system 104 (e.g., layout configurator 114) can generate the example layout in the drawing section 704. The user can add new coordinates via input to the GUI 700 or change the relative location of the coordinates.

For a predefined geometry 702, the total coordinates may be predefined by the administrator, such as two coordinates for the straight run design, three coordinates for the L-shape design, four coordinates for the U-shape and rectangular designs, etc. In some cases, if one of the predefined geometry 702 is selected, the data processing system 104 (e.g., layout configurator 114) can populate the drawing section 704 (e.g., digital blueprint) with an example layout. In certain cases, if the predefined geometry 702 is selected, the shape of the layout may be fixed, such that changing the coordinates can change at least one of the length, width, height, orientation, or positioning of the layout, without affecting the type of geometry 702. In some other cases, adjusting the dimension (e.g., length, width, or height) or orientation of the layout can be performed using an object frame surrounding the layout or a rotational interactive element, for example. In this case, the data processing system 104 can change the selected geometry 702 to a custom geometry in response to adding or changing coordinate(s) in the digital blueprint.

Although the example layout includes a single run of light fixtures, the data processing system 104 can generate multiple runs of light fixtures based on the input coordinates and whether certain coordinates should be connected to other coordinates. Each of the runs can include light fixtures electrically coupled with each other. The light fixtures of different runs may or may not be electrically coupled with each other.

The example layout in drawing section 704 can be configured as a U-shape design. The data processing system 104 (e.g., light fixture selector 116) can use the model to select light fixtures having the selected attributes and conform with various constraints (e.g., gap constraint, power constraint, etc.). The attributes may be a part of the constraints. The GUI 700 can include a measurement of the lighting system for installation in the physical space. The lighting direction can be defaulted to illuminate towards the center of the U-shape design. The lighting direction can be reversed in response to interaction with the "reverse light" interactive element of the geometry 702. The GUI 700 can include a corner light fixture if the "lit corner" option is selected in the geometry 702 option. Depending on certain attributes (e.g., luminescent type, mounting type, or luminescent features), the corner light fixture may not be available, hence the "lit corner" option may not be presented.

The drawing section 704 can include selected light fixtures (e.g., selected by the data processing system 104) positioned to conform with the layout. The data processing system 104 can use the model to select various straight lights (e.g., shown in the legend as "Straight Light" 1-4) and L-shape lights (e.g., shown in the legend as "L-Shape Light") positioned within a boundary. Each light fixture can include two ends. A first end can include a receiving end for receiving electricity, and a second end can include a plug end to connect one unit to another. At the end of a run, the data processing system 104 can use a light fixture including the receiving end and a voided end. The voided end may not include a plug to connect with another unit. The voided end can be configured to overlap a power feed, such that the gap constraint is satisfied when providing another run of light fixtures continuous from the prior run. The data processing system 104 can responsively analyze the constraints as the layout is adjusted, such that locations, lengths, or angles of the light fixtures can be modified or re-selected according to the adjusted layout while satisfying the constraints. Straight lights 1-4 may include different lengths or types of ends. For instance, the data processing system 104 can select the L-shape light for positioning at the corners of the U-shape design, the straight lights 1, 3, and 4 to satisfy the constraints and conform with the layout, and the straight light 2 (e.g., includes a voided end) for positioning at the end of the run. Additional details for each illustrated light fixture can be shown via interaction with the GUI 700.

Each light fixture can include a port for electrical connection with a battery for emergency power backup. When connected, the light fixture can be an emergency light. The data processing system 104 can receive input from the user of the client device 106 to insert or convert the existing light fixture to an emergency light. The data processing system 104 can receive input from the user to force power input (e.g., add power feed or move an existing power feed to the desired position). In response to inserting the power feed at the desired position according to the input (e.g., coordinate or position of the digital blueprint), the data processing system 104 can re-select the light fixtures. For example, prior to the power feed, the data processing system 104 can select a light fixture with a voided end. In another example, if the existing power feed is moved to another position between two light fixtures, the data processing system 104 can select two light fixtures with the voided end and position these light fixtures at the opposite ends of the run, in this case. The data processing system 104 can select the light fixtures that are available to avoid errors in the user selecting unavailable light fixtures.

Figure 8:
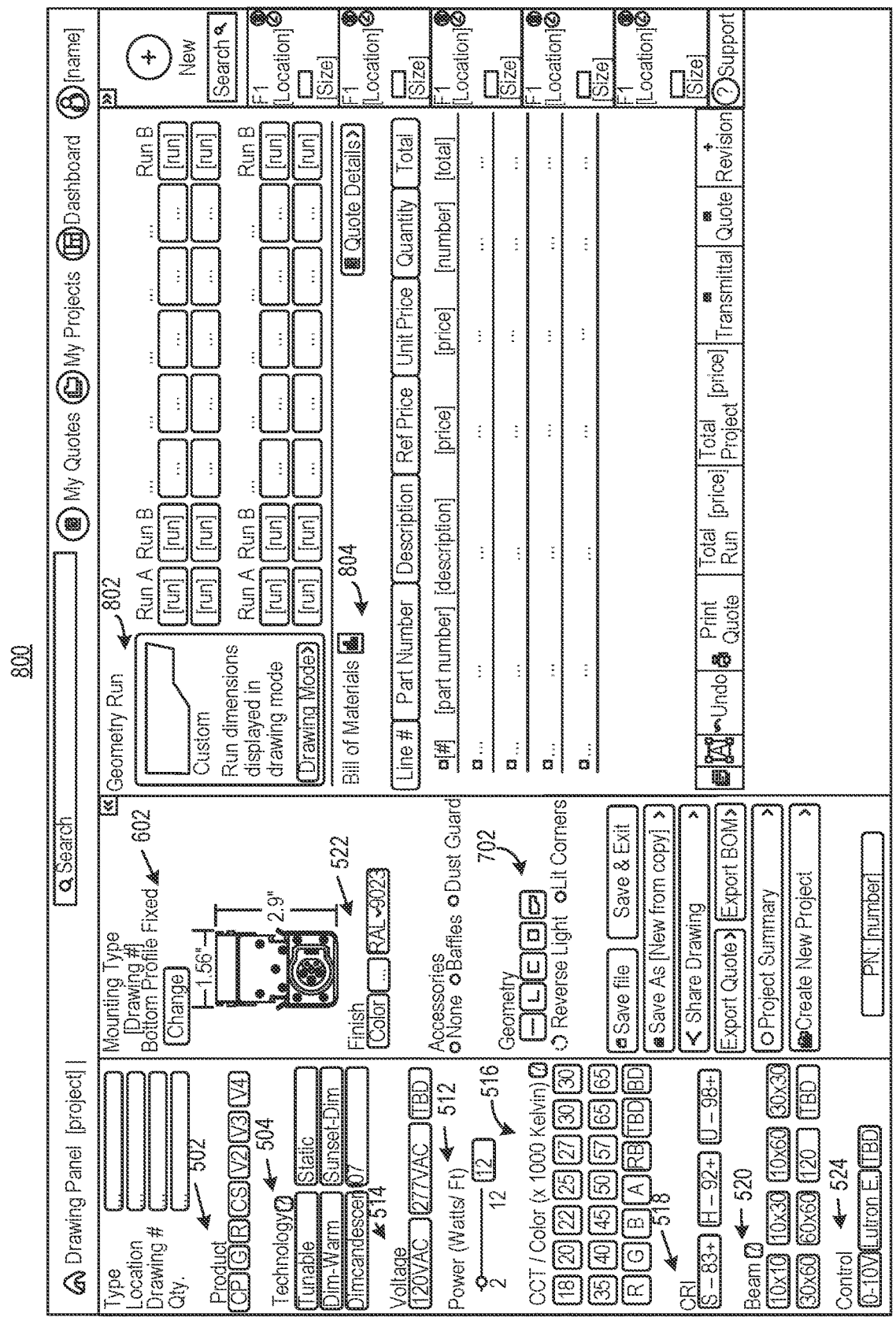

Referring to FIG. 8, the GUI 800 can represent the drawing page with an overview of the light fixtures selected for the layout. In some cases, the GUI 800 can represent a quote page indicating materials (e.g., light fixtures) available for purchase to complete the project or lighting system. The GUI 800 can include a geometry run section 802 and a material section 804. In this case, the geometry run section 802 can show the type of geometry 702 selected by the user (e.g., custom geometry), various light fixtures included selected by the data processing system 104 to conform with the layout, and an interactive element to redirect to the drawing section 704 (e.g., display GUI 700). The material section 804 can include information related to the selected light fixtures of the layout, such as at least one of line number (e.g., label in the drawing for the respective part), the part number (e.g., serial number or identification of the light fixture), description, reference price, unit price, quantity, or total price, etc. The material section 804 can represent a portion of the quote for the user to order the light fixtures. The data processing system 104 can link the selected light fixtures to the quote page, thereby expediting the process to request the light fixtures from the entity.

Referring to FIG. 9, the GUI 900 can represent various projects (e.g., orders or sets of purchased light fixtures) historically purchased via the account used to access the application. The GUI 900 can include at least one of an overview of project information, dates (e.g., approval date, validation date, or shipment date, etc.), status of the order (e.g., starting, production, shipped, delivered, etc.), an indication of whether the order has been completed, or an interactive element to achieve the order, among others.

Figure 10:
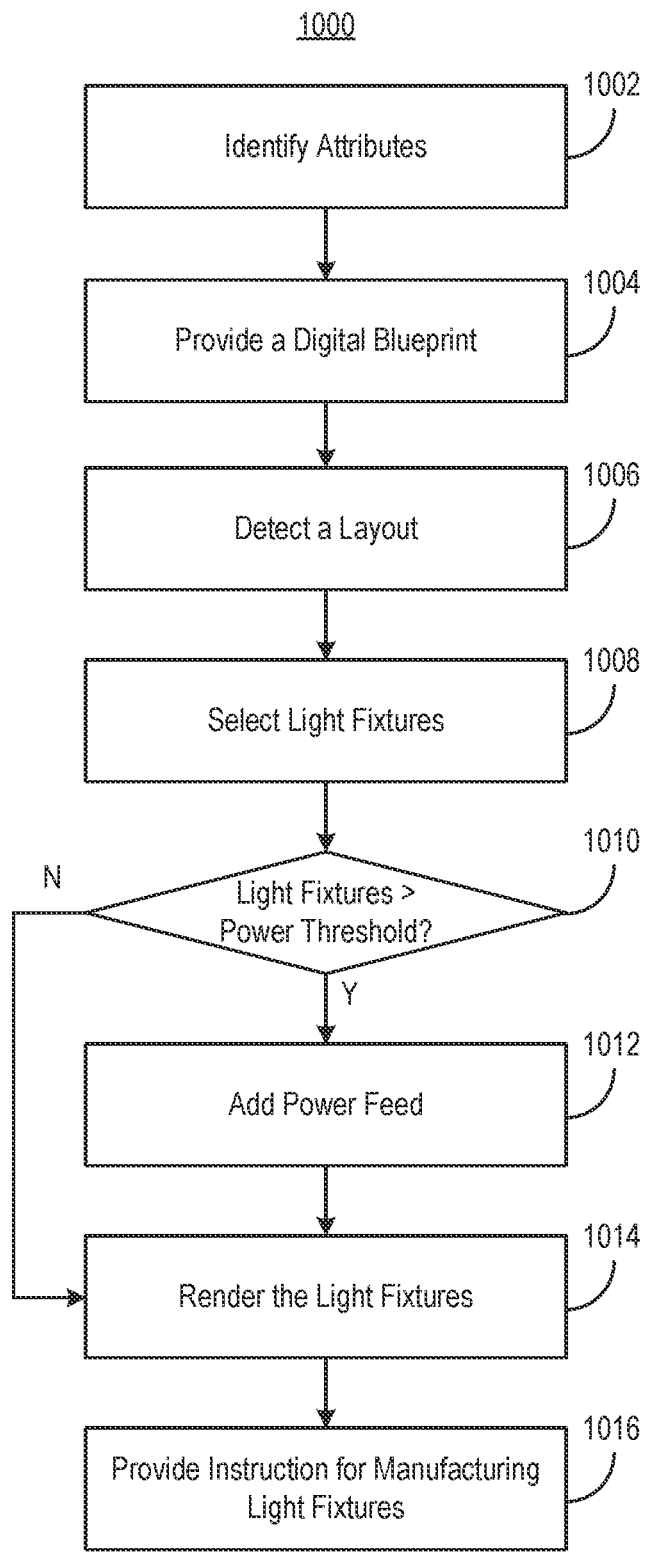
FIG. 10 is an example flow diagram of a method for manufacturing light fixtures, in accordance with an implementation.

Referring to FIG. 10, an example flow diagram of a method 1000 for manufacturing light fixtures. The example method 1000 can be executed, performed, or otherwise carried out by one or more components of the system 100 (e.g., data processing system 104, client device 106, manufacturing device 108, etc.). The method 1000 can include identifying attributes, at ACT 1002. At ACT 1004, the method 1000 can include providing a digital blueprint. At ACT 1006, the method 1000 can include detecting a layout. At ACT 1008, the method 1000 can include selecting light fixtures. At ACT 1010, the method 1000 can include determining whether the light fixtures exceed a power threshold. At ACT 1012, the method 1000 can include adding a power feed. At ACT 1014, the method 1000 can include rendering the light fixtures. At ACT 1016, the method 1000 can include providing instruction for manufacturing light fixtures.

Still referring to FIG. 10 in further detail, at ACT 1002, the data processing system can identify attributes of a lighting system. The attributes can include at least one of a luminescent type, a mounting type, or a luminescent feature. The attributes can be adjusted by an administrator of the data processing system.

At ACT 1004, the data processing system can provide a digital blueprint of a physical space in which the lighting system is to be installed via a GUI. The data processing system can provide the digital blueprint via an application or a website accessible to a client device. The data processing system can manage the application. In some cases, the data processing system can provide the digital blueprint via a session hosted by the data processing system and established with the client device.

The data processing system can detect, in response to input by a user using the client device via the GUI, various coordinates on the digital blueprint for installation of the lighting system. Based on the coordinates on the digital blueprint, the data processing system can generate a layout including one or more interconnecting lines or conjunction between one or more combinations of the coordinates. The data processing system can detect changes to the layout in response to input via the GUI, such as adding, moving, or removing coordinates from the digital blueprint. In some cases, the changes to the layout can include changing the lighting direction, managing power feed, managing emergency light fixtures/units, resizing the shape of the layout, managing corner lighting, changing the selection of certain attributes, etc.

At ACT 1006, the data processing system can detect the layout for installation of the lighting system responsive to the input via the GUI. The data processing system can detect the various portions of the layout as the coordinates are provided in the digital blueprint. The data processing system can detect a new layout in response to the input or an existing layout retrieved from a data repository via the input, for example.

At ACT 1008, the data processing system can select one or more light fixtures using a model. The data processing system can use the model configured to satisfy a gap constraint, among other constraints. The data processing system can use the model to select the light fixtures based on the layout and the attributes selected by the user, such that the gap constraint is satisfied when the light fixtures are electrically coupled to conform to the layout. The gap constraint can be predefined by the administrator, such as 0.5 inches, 0.4 inches, 0.3 inches, etc. The data processing system can select the size (e.g., length) of the light fixtures having the attributes and position of the selected light fixtures to conform with the layout, such that the gap between the light fixtures are at or below the gap constraint (e.g., maximum gap threshold).

In some cases, the data processing system can select the model from various models stored in the data repository based on at least one of the attributes selected by the user. In this case, the data processing system can use the model to select light fixtures that have the attribute(s) selected by the user. In certain cases, the data processing system can select the model from various models based on at least one or a combination of the luminescent type, mounting type, or luminescent feature. In this case, the data processing system can use the model to select the light fixtures having one or a combination of the various attributes (e.g., luminescent type, mounting type, or luminescent feature).

The data processing system can select the light fixtures including a first light fixture and a second light fixture. The first and second light fixtures can have different configurations from each other. The configuration can include at least one of the length or the shape of the light fixtures. The availability of the length (or shape) of the light fixtures can depend on at least one of the attributes selected. The length may be predefined by an entity manufacturing or distributing the light fixtures, such as 4 inches, 8 inches, 12 inches, 16 inches, 18 inches, 32 inches, 48 inches, etc. The shape may include at least a straight light unit, an L-shape light unit, or other angles of light units.

In some cases, the data processing system can detect, responsive to input via the GUI, the layout (e.g., coordinates entered via the GUI) including a first dimension and a second dimension. The second dimension can be perpendicular with the first dimension. In this case, the data processing system can select light fixtures including a first, a second, and a third light fixture. The first light fixture can have a first run size and be a straight run (e.g., straight shape/design). The second light fixture can have a second run size and be an L-shape. The third light fixture can have a third size and be another straight run. To conform with the layout, the data processing system can (e.g., digitally) electrically couple the first light fixture to the third light fixture via the second light fixture in the digital blueprint, such that the first light fixture is perpendicular to the second light fixture.

In some cases, the data processing system can identify attributes including an emergency lighting type. The data processing system can detect, responsive to input via the GUI, an indication of emergency lighting type selection and associated coordinates. The data processing system can select an emergency light unit for the digital blueprint to conform with the layout. In some cases, if the coordinate(s) correspond to an existing light fixture, the data processing system can select the existing light fixture and update the selected light fixture to the emergency light unit for connection with a battery source.

The data processing system can identify the direction for lighting and a number of power feeds for the layout. The data processing system can select the light fixtures based on the direction and the number of power feeds, such as the selection of light fixtures with a voided end or light fixtures for lighting in a certain direction. The data processing system can identify the direction of lighting based on selected attribute(s) or a user-selected geometry for the lighting system, for example.

In some other cases, the data processing system can select the model to satisfy a unit of energy per distance ratio. In this case, the data processing system can use the model to determine whether the run of light fixtures satisfies the unit of energy per distance ratio (e.g., power constraint, such as watts per foot of the light fixture).

At ACT 1010, the data processing system can determine whether the light fixtures, selected via the model, exceed a power threshold (e.g., power constraint). The data processing system can proceed to ACT 1012 if the light fixtures exceed the power threshold. The data processing system can proceed to ACT 1014 if the light fixtures do not exceed the power threshold. The power threshold can be based on the unit of energy per distance ratio according to the selected attributes, such as at least one of the desired luminaire output, CCT, CRI, outlet voltage, etc. For instance, the selected attributes can affect the wattage per foot for operating the light fixtures. The wattage per foot can indicate the maximum distance of light fixtures that can be powered given the outlet voltage (e.g., maximum power feed output).

At ACT 1012, the data processing system can add a second power feed responsive to determining that the light fixtures exceed the power threshold. The data processing system can add the second power feed at the end of a first set of light fixtures (e.g., first run) that exceeded the power threshold, such that a second set of light fixtures (e.g., second run) can be positioned continuing from the first set of light fixtures and powered with the second power feed.

At ACT 1014, the data processing system can select at least a portion of the light fixtures responsive to detecting, via the GUI, at least a portion of the layout for installation prior to completion of the layout for installation. The data processing system can provide the portion of the light fixtures, prior to the completion of the layout for installation, for rendering via the GUI. The data processing system can continue to provide various portions of the light fixtures for rendering via the GUI before and after completion. The data processing system can provide an updated portion(s) of the layout for rendering via the GUI.

At ACT 1016, the data processing system can provide instruction to a manufacturing device to cause the manufacturing of the selected light fixtures in accordance with the layout and the plurality of attributes. In some cases, the data processing system can provide the instruction to cause a distribution of the selected light fixtures, if the light fixtures are available in the inventor of the manufacturer or distributor, for example. Accordingly, the data processing system can enable the user to visualize the layout for the installation of the lighting system and select desired attributes of the lighting system without compatibility or availability errors.

Figure 11:
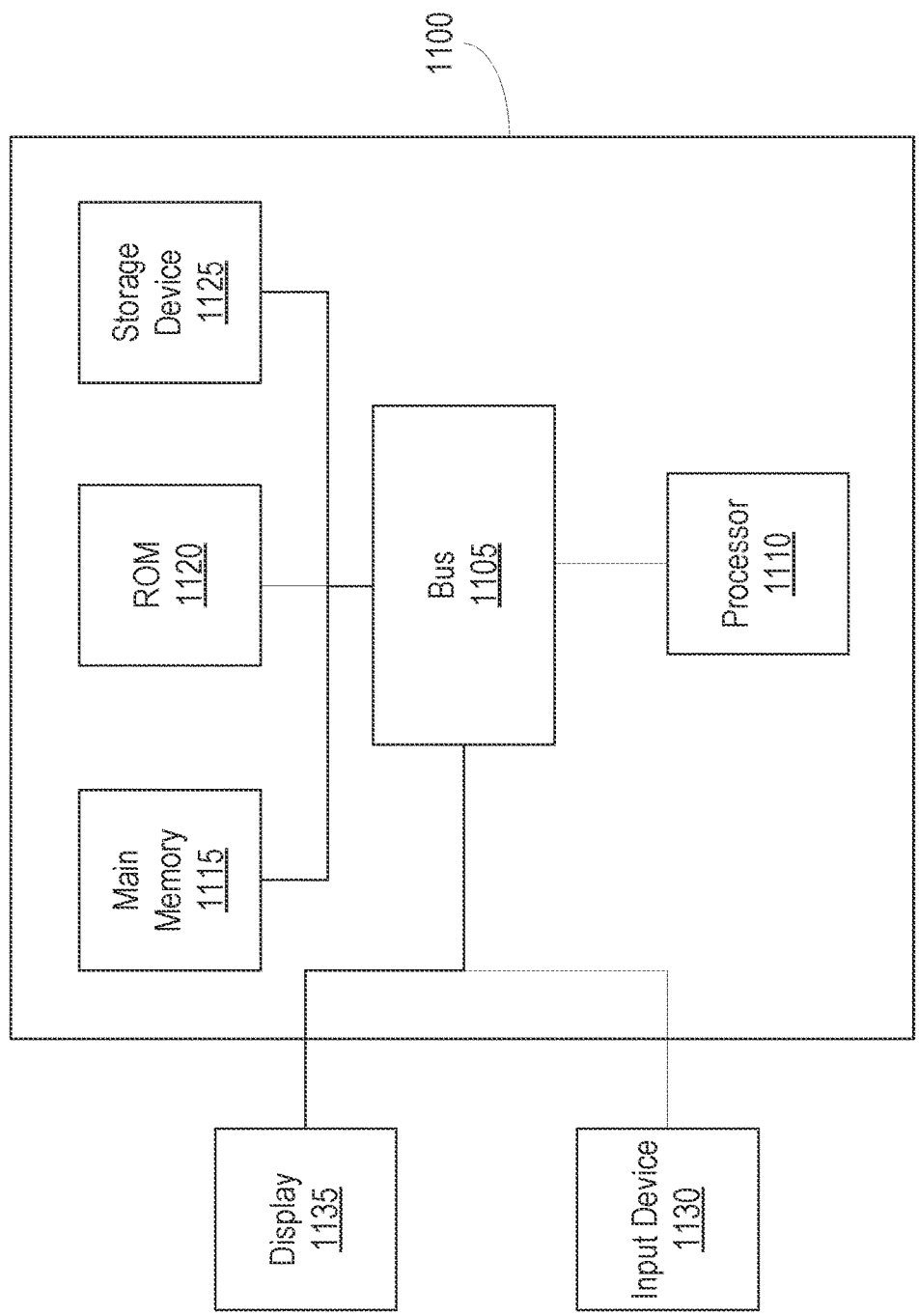
FIG. 11 is a block diagram illustrating an architecture for a computer system that can be employed to implement elements of the systems and methods described and illustrated herein, including, for example, aspects of the system depicted in FIG. 1, and the operations depicted in FIGS. 2-10.

FIG. 11 is a block diagram of an example computer system 1100. The computer system or computing device 1100 can include or be used to implement the data processing system 104, or its components such as the data processing system 104. The computing system 1100 includes at least one bus 1105 or other communication component for communicating information and at least one processor 1110 or processing circuit coupled to the bus 1105 for processing information. The computing system 1100 can also include one or more processors 1110 or processing circuits coupled to the bus for processing information. The computing system 1100 also includes at least one main memory 1115, such as a random access memory (RAM) or other dynamic storage device, coupled to the bus 1105 for storing information, and instructions to be executed by the processor 1110. The main memory 1115 can also be used for storing position information, utility grid data, command instructions, device status information, environmental information within or external to the utility grid, information on characteristics of electricity, or other information during execution of instructions by the processor 1110. The computing system 1100 may further include at least one read only memory (ROM) 1120 or other static storage device coupled to the bus 1105 for storing static information and instructions for the processor 1110. A storage device 1125, such as a solid state device, magnetic disk or optical disk, can be coupled to the bus 1105 to persistently store information and instructions.

The computing system 1100 may be coupled via the bus 1105 to a display 1135, such as a liquid crystal display, or active matrix display, for displaying information to a user such as an administrator of the data processing system or the utility grid. An input device 1130, such as a keyboard or voice interface may be coupled to the bus 1105 for communicating information and commands to the processor 1110. The input device 1130 can include a touch screen display 1135. The input device 1130 can also include a cursor control, such as a mouse, a trackball, or cursor direction keys, for communicating direction information and command selections to the processor 1110 and for controlling cursor movement on the display 1135. The display 1135 can be part of the data processing system 104, or other component of FIG. 1.

The processes, systems and methods described herein can be implemented by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. Hard-wired circuitry can be used in place of or in combination with software instructions together with the systems and methods described herein. Systems and methods described herein are not limited to any specific combination of hardware circuitry and software.

FURTHER EXAMPLES

The following examples pertain to further embodiments, from which numerous permutations and configurations will be apparent.

Example 1 includes a method of manufacturing light fixtures, comprising: identifying, by a data processing system comprising one or more processors and memory, a plurality of attributes of a lighting system, the plurality of attributes comprising at least one of a luminescent type, a mounting type, or a luminescent feature; detecting, by the data processing system responsive to input via a graphical user interface, a layout for installation of the lighting system; selecting, by the data processing system using a model configured to satisfy a gap constraint, a plurality of light fixtures based on the layout and the plurality of attributes that, when electrically coupled to conform to the layout, satisfy the gap constraint; and providing, by the data processing system, an instruction to cause manufacturing of the selected plurality of light fixtures in accordance with the layout and the plurality of attributes.

Example 2 includes the subject matter of Example 1, comprising: providing, by the data processing system via the graphical user interface, a digital blueprint of a physical space in which the lighting system is to be installed; detecting, by the data processing system responsive to input via the graphical user interface, a plurality of coordinates on the digital blueprint for installation of the lighting system; and generating, by the data processing system, the layout based on the plurality of coordinates on the digital blueprint.

Example 3 includes the subject matter of any of Examples 1 and 2, comprising: detecting, by the data processing system responsive to input via the graphical user interface, the layout comprising a first dimension and a second dimension that is perpendicular with the first dimension; and selecting, by the data processing system, the plurality of light fixtures comprising a first light fixture with a first run size and a straight run, a second light fixture with a second run size and an L-shape, and a third light fixture with a third size and the straight run, wherein the first light fixture is electrically coupled to the third light fixture via the second light fixture.

Example 4 includes the subject matter of any of Examples 1 through 3, comprising: selecting, by the data processing system, the model from a plurality of models based on at least one of the plurality of attributes.

Example 5 includes the subject matter of any of Examples 1 through 4, comprising: selecting, by the data processing system, the model from a plurality of models based on the mounting type and the luminescent feature.

Example 6 includes the subject matter of any of Examples 1 through 5, comprising: selecting, by the data processing system, the model to satisfy a unit of energy per distance ratio.

Example 7 includes the subject matter of any of Examples 1 through 6, comprising: selecting, by the data processing system, the plurality of light fixtures comprising a first light fixture and a second light fixture having a different configuration than the first light fixture.

Example 8 includes the subject matter of any of Examples 1 through 7, comprising: wherein the different configuration comprises at least one of a length or a shape.

Example 9 includes the subject matter of any of Examples 1 through 8, comprising: selecting, by the data processing system, at least a portion of the plurality of light fixtures responsive to detecting, via the graphical user interface, at least a portion of the layout for installation prior to completion of the layout for installation; and providing, by the data processing system, for render via the graphical user interface prior to completion of the layout for installation, the at least the portion of the plurality of light fixtures.

Example 10 includes the subject matter of any of Examples 1 through 9, comprising: identifying, by the data processing system, the plurality of attributes comprising an emergency lighting type.

Example 11 includes the subject matter of any of Examples 1 through 10, comprising: identifying, by the data processing system, a direction for lighting and a number of power feeds for the layout; and selecting, by the data processing system, the plurality of light fixtures based on the direction and the number of power feeds.

Example 12 includes the subject matter of any of Examples 1 through 11, comprising: determining, by the data processing system, the plurality of light fixtures selected via the model exceeds a power threshold; and adding, by the data processing system, a second power feed responsive to the determination.

Example 13 includes a system comprising: a data processing system comprising one or more processors, coupled with memory, to: identify a plurality of attributes of a lighting system, the plurality of attributes comprising at least one of a luminescent type, a mounting type, or a luminescent feature; detect, responsive to input via a graphical user interface, a layout for installation of the lighting system; select, via a model configured to satisfy a gap constraint, a plurality of light fixtures based on the layout and the plurality of attributes that, when electrically coupled to conform to the layout, satisfy the gap constraint; and provide an instruction to cause manufacturing of the selected plurality of light fixtures in accordance with the layout and the plurality of attributes.

Example 14 includes the subject matter of Example 13, wherein the data processing system is further configured to: provide, via the graphical user interface, a digital blueprint of a physical space in which the lighting system is to be installed; detect, responsive to input via the graphical user interface, a plurality of coordinates on the digital blueprint for installation of the lighting system; and generate the layout based on the plurality of coordinates on the digital blueprint.

Example 15 includes the subject matter of any of Examples 13 and 14, wherein the data processing system is further configured to: detect, responsive to input via the graphical user interface, the layout comprising a first dimension and a second dimension that is perpendicular with the first dimension; and select the plurality of light fixtures comprising a first light fixture with a first run size and a straight run, a second light fixture with a second run size and an L-shape, and a third light fixture with a third size and the straight run, wherein the first light fixture is electrically coupled to the third light fixture via the second light fixture.

Example 16 includes the subject matter of any of Examples 13 through 15, wherein the data processing system is further configured to: select the model from a plurality of models based on at least one of the plurality of attributes.

Example 17 includes the subject matter of any of Examples 13 through 16, wherein the data processing system is further configured to: select the plurality of light fixtures comprising a first light fixture and a second light fixture having a different configuration than the first light fixture.

Example 18 includes the subject matter of any of Examples 13 through 17, wherein the data processing system is further configured to: determine the plurality of light fixtures selected via the model exceeds a power threshold; and add a second power feed responsive to the determination.

Example 19 includes a non-transitory computer readable storage medium storing instructions that, when executed by one or more processors, cause the one or more processors to: identify a plurality of attributes of a lighting system, the plurality of attributes comprising at least one of a luminescent type, a mounting type, or a luminescent feature; detect, responsive to input via a graphical user interface, a layout for installation of the lighting system; select, via a model configured to satisfy a gap constraint, a plurality of light fixtures based on the layout and the plurality of attributes that, when electrically coupled to conform to the layout, satisfy the gap constraint; and provide an instruction to cause manufacturing of the selected plurality of light fixtures in accordance with the layout and the plurality of attributes.

Example 20 includes the subject matter of Example 19, wherein the instructions further comprise instructions to: provide, via the graphical user interface, a digital blueprint of a physical space in which the lighting system is to be installed; detect, responsive to input via the graphical user interface, a plurality of coordinates on the digital blueprint for installation of the lighting system; and generate the layout based on the plurality of coordinates on the digital blueprint.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the descriptions herein emphasize the structural independence of the aspects of the system components (e.g., arbitration component) and illustrate one grouping of operations and responsibilities of these system components. Other groupings that execute similar overall operations are understood to be within the scope of the present application. Modules can be implemented in hardware or as computer instructions on a non-transient computer-readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of manufacturing light fixtures, comprising:
identifying, by a data processing system comprising one or more processors and memory, a plurality of attributes of a lighting system, the plurality of attributes comprising at least one of a luminescent type, a mounting type, or a luminescent feature;

detecting, by the data processing system responsive to input via a graphical user interface, a layout for installation of the lighting system;

selecting, by the data processing system using a model configured to satisfy a gap constraint, a plurality of light fixtures based on the layout and the plurality of attributes that, when electrically coupled to conform to the layout, satisfy the gap constraint; and providing, by the data processing system, an instruction to cause manufacturing of the selected plurality of light fixtures in accordance with the layout and the plurality of attributes.

2. The method of claim 1, comprising:

providing, by the data processing system via the graphical user interface, a digital blueprint of a physical space in which the lighting system is to be installed;

detecting, by the data processing system responsive to input via the graphical user interface, a plurality of coordinates on the digital blueprint for installation of the lighting system; and generating, by the data processing system, the layout based on the plurality of coordinates on the digital blueprint.

3. The method of claim 1, comprising:

detecting, by the data processing system responsive to input via the graphical user interface, the layout comprising a first dimension and a second dimension that is perpendicular with the first dimension; and selecting, by the data processing system, the plurality of light fixtures comprising a first light fixture with a first run size and a straight run, a second light fixture with a second run size and an L-shape, and a third light fixture with a third size and the straight run, wherein the first light fixture is electrically coupled to the third light fixture via the second light fixture.

4. The method of claim 1, comprising:

selecting, by the data processing system, the model from a plurality of models based on at least one of the plurality of attributes.

5. The method of claim 1, comprising:

selecting, by the data processing system, the model from a plurality of models based on the mounting type and the luminescent feature.

6. The method of claim 1, comprising:

selecting, by the data processing system, the model to satisfy a unit of energy per distance ratio.

7. The method of claim 1, comprising:

selecting, by the data processing system, the plurality of light fixtures comprising a first light fixture and a second light fixture having a different configuration than the first light fixture.

8. The method of claim 7, comprising:

wherein the different configuration comprises at least one of a length or a shape.

9. The method of claim 1, comprising:

selecting, by the data processing system, at least a portion of the plurality of light fixtures responsive to detecting, via the graphical user interface, at least a portion of the layout for installation prior to completion of the layout for installation; and providing, by the data processing system, for render via the graphical user interface prior to completion of the layout for installation, the at least the portion of the plurality of light fixtures.

10. The method of claim 1, comprising:

identifying, by the data processing system, the plurality of attributes comprising an emergency lighting type.

11. The method of claim 1, comprising:

identifying, by the data processing system, a direction for lighting and a number of power feeds for the layout; and selecting, by the data processing system, the plurality of light fixtures based on the direction and the number of power feeds.

12. The method of claim 1, comprising:

determining, by the data processing system, the plurality of light fixtures selected via the model exceeds a power threshold; and adding, by the data processing system, a second power feed responsive to the determination.

13. A system, comprising:

a data processing system comprising one or more processors, coupled with memory, to:

identify a plurality of attributes of a lighting system, the plurality of attributes comprising at least one of a luminescent type, a mounting type, or a luminescent feature;

detect, responsive to input via a graphical user interface, a layout for installation of the lighting system;

select, via a model configured to satisfy a gap constraint, a plurality of light fixtures based on the layout and the plurality of attributes that, when electrically coupled to conform to the layout, satisfy the gap constraint; and provide an instruction to cause manufacturing of the selected plurality of light fixtures in accordance with the layout and the plurality of attributes.

14. The system of claim 13, wherein the data processing system is further configured to:

provide, via the graphical user interface, a digital blueprint of a physical space in which the lighting system is to be installed;

detect, responsive to input via the graphical user interface, a plurality of coordinates on the digital blueprint for installation of the lighting system; and generate the layout based on the plurality of coordinates on the digital blueprint.

15. The system of claim 13, wherein the data processing system is further configured to:

detect, responsive to input via the graphical user interface, the layout comprising a first dimension and a second dimension that is perpendicular with the first dimension; and select the plurality of light fixtures comprising a first light fixture with a first run size and a straight run, a second light fixture with a second run size and an L-shape, and a third light fixture with a third size and the straight run, wherein the first light fixture is electrically coupled to the third light fixture via the second light fixture.

16. The system of claim 13, wherein the data processing system is further configured to:

select the model from a plurality of models based on at least one of the plurality of attributes.

17. The system of claim 13, wherein the data processing system is further configured to:

select the plurality of light fixtures comprising a first light fixture and a second light fixture having a different configuration than the first light fixture.

18. The system of claim 13, wherein the data processing system is further configured to:

determine the plurality of light fixtures selected via the model exceeds a power threshold; and add a second power feed responsive to the determination.

19. A non-transitory computer readable storage medium storing instructions that, when executed by one or more processors, cause the one or more processors to:
- identify a plurality of attributes of a lighting system, the plurality of attributes comprising at least one of a luminescent type, a mounting type, or a luminescent feature;
- detect, responsive to input via a graphical user interface, a layout for installation of the lighting system;
- select, via a model configured to satisfy a gap constraint, a plurality of light fixtures based on the layout and the plurality of attributes that, when electrically coupled to conform to the layout, satisfy the gap constraint; and
- provide an instruction to cause manufacturing of the selected plurality of light fixtures in accordance with the layout and the plurality of attributes.

20. The non-transitory computer readable storage medium of claim 19, wherein the instructions further comprise instructions to:
- provide, via the graphical user interface, a digital blueprint of a physical space in which the lighting system is to be installed;
- detect, responsive to input via the graphical user interface, a plurality of coordinates on the digital blueprint for installation of the lighting system; and
- generate the layout based on the plurality of coordinates on the digital blueprint.

* * * * *